United States Patent [19]
Savage et al.

[11] 3,881,533
[45] May 6, 1975

[54] TREE HARVESTER

[76] Inventors: Donald D. Savage, 2883 Cobb St.; Robert V. Chambers, 2895 Robinson Rd., N.E.; Maurice T. Mills, 108 Margaret Ave., N.E., all of Marietta, Ga. 30060

[22] Filed: Sept. 29, 1972

[21] Appl. No.: 293,482

[52] U.S. Cl. .................. 144/3 D; 83/795; 144/2 Z; 144/309 AC; 212/45
[51] Int. Cl. ............................................. A01g 23/00
[58] Field of Search....... 83/928, 795; 144/2 Z, 3 D, 144/34 R, 309 AC; 214/3; 147 G; 212/145

[56] References Cited
UNITED STATES PATENTS

| | | | |
|---|---|---|---|
| 3,074,446 | 1/1963 | Earl | 144/3 D |
| 3,112,830 | 12/1963 | Podlesak | 214/3 |
| 3,140,736 | 7/1964 | Propst | 144/3 D |
| 3,277,936 | 10/1966 | Larson | 144/34 R |
| 3,356,116 | 12/1967 | Brundell et al. | 144/3 D |
| 3,461,928 | 8/1969 | Siiro | 144/3 D |
| 3,498,347 | 3/1970 | Vit | 144/3 D |
| 3,498,350 | 3/1970 | Maradyn | 144/309 AC |
| 3,618,647 | 11/1971 | Stuart | 144/3 D |
| 3,620,272 | 11/1971 | Eriksson | 144/3 D |
| 3,688,821 | 9/1972 | McColl | 144/3 D |
| 3,688,822 | 9/1972 | Gutman et al. | 144/3 D |

*Primary Examiner*—Gerald A. Dost
*Attorney, Agent, or Firm*—B. J. Powell

[57] ABSTRACT

A tree harvester for felling and processing standing trees into predetermined lengths which includes generally a prime mover capable of turning in a short radius with a relatively short support frame as compared to the prior art mounted on the prime mover, a main support bed pivotally mounted at its upper end to the forward end of the frame for pivoting from a vertical position in which the lower end thereof is near the ground to a horizontal position above the prime mover, a set of holding clamps mounted on the support bed for holding a tree stationary with respect to the bed, a cutting assembly mounted on that end of the bed opposite its pivoted end and movable with the bed as well as with respect to the bed for selectively felling trees and cutting them into selected lengths, a traversing drive assembly carried by the bed and selectively engageable with a tree on the bed for driving the tree longitudinally thereacross, an adjustable delimbing mechanism carried by the bed and frame for selectively delimbing the tree as it is driven by the traversing assembly, topping means carried by the frame for shearing the top from the tree, outrigger means mounted on the frame and selectively extendable to engage the ground around the prime mover for increasing the effective support area of the machine, and automatic control means for controlling the operation of the bed, clamps, cutting assembly, traversing drive assembly, delimbing assembly, topping means, and outrigger means.

31 Claims, 25 Drawing Figures

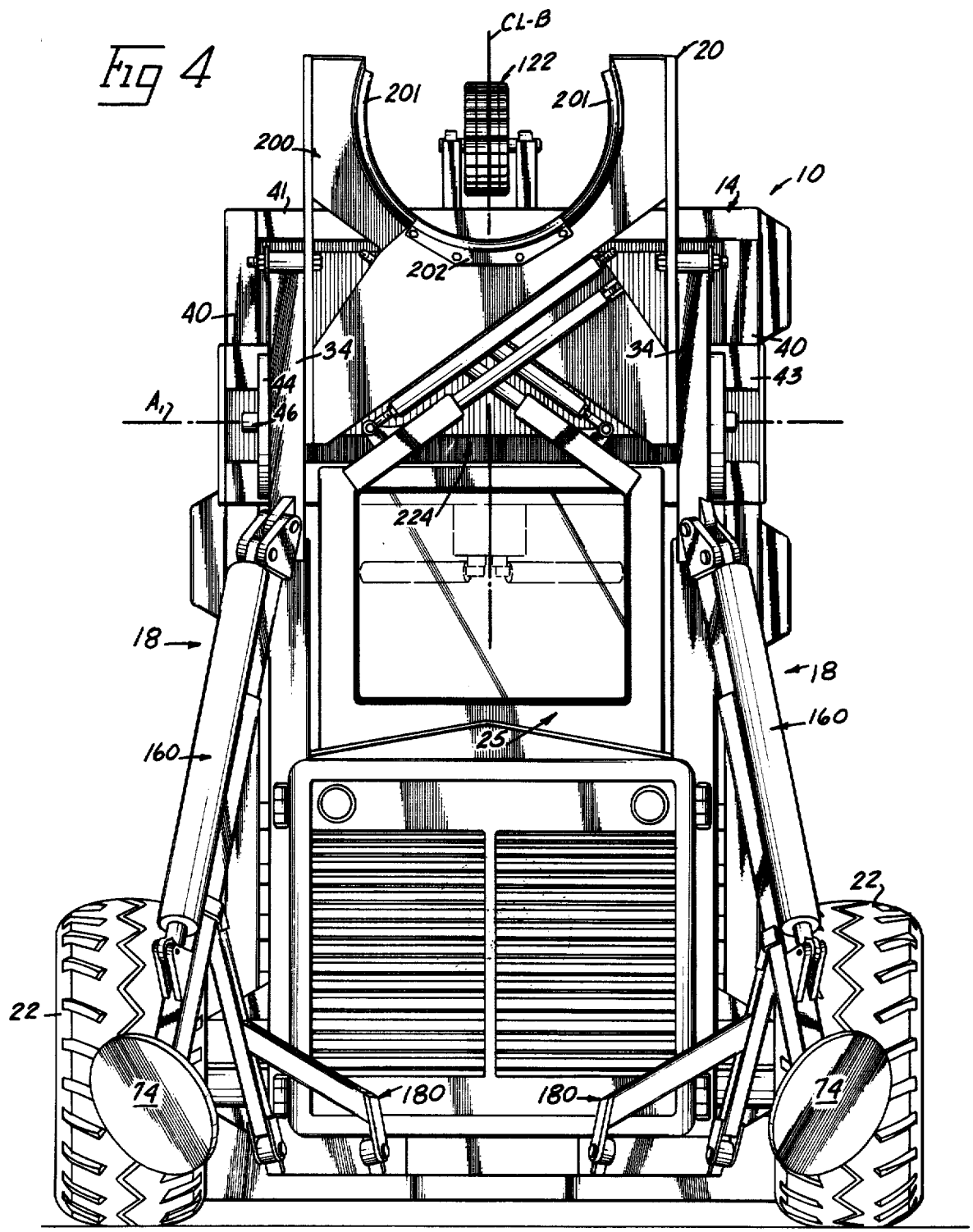

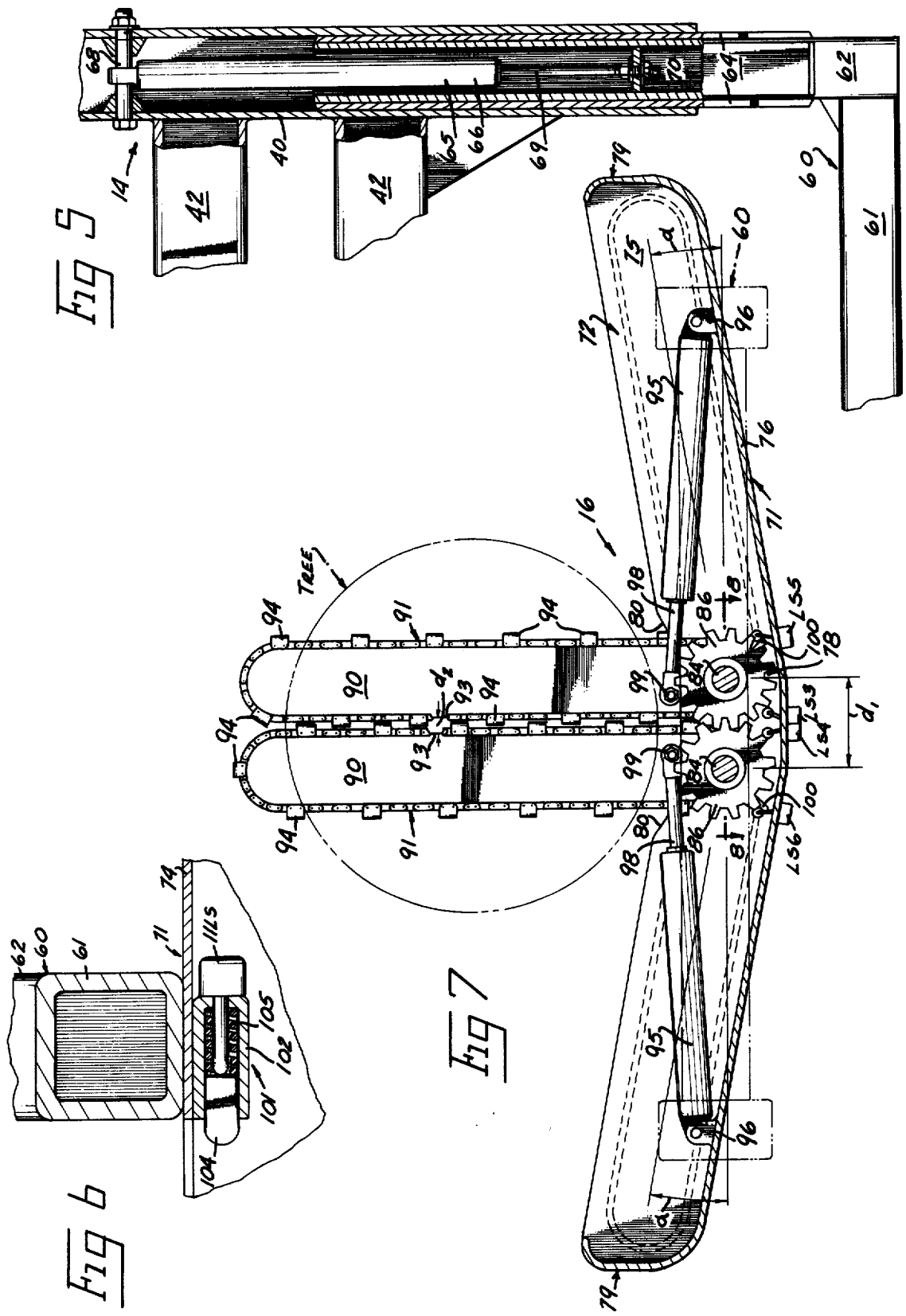

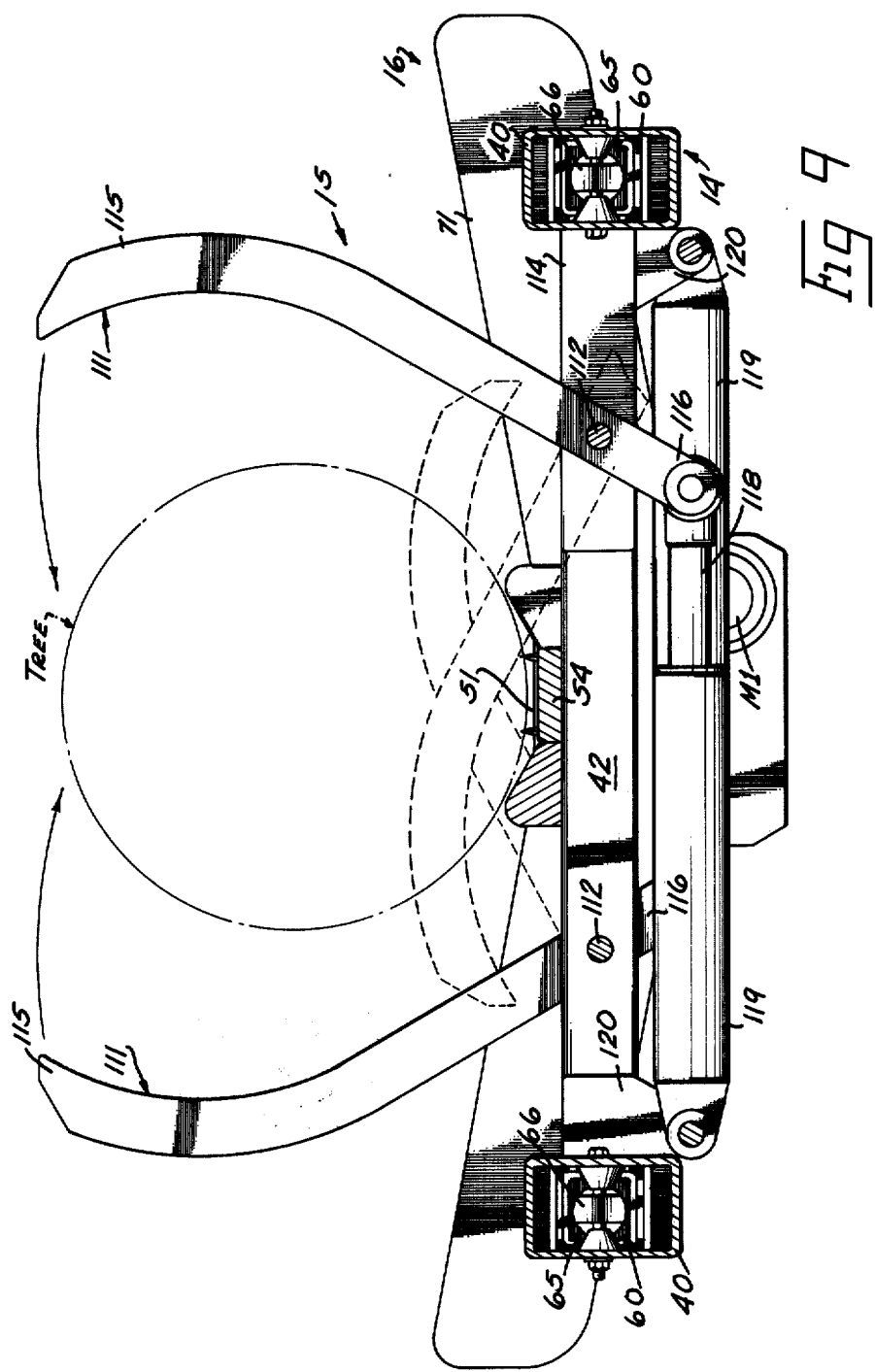

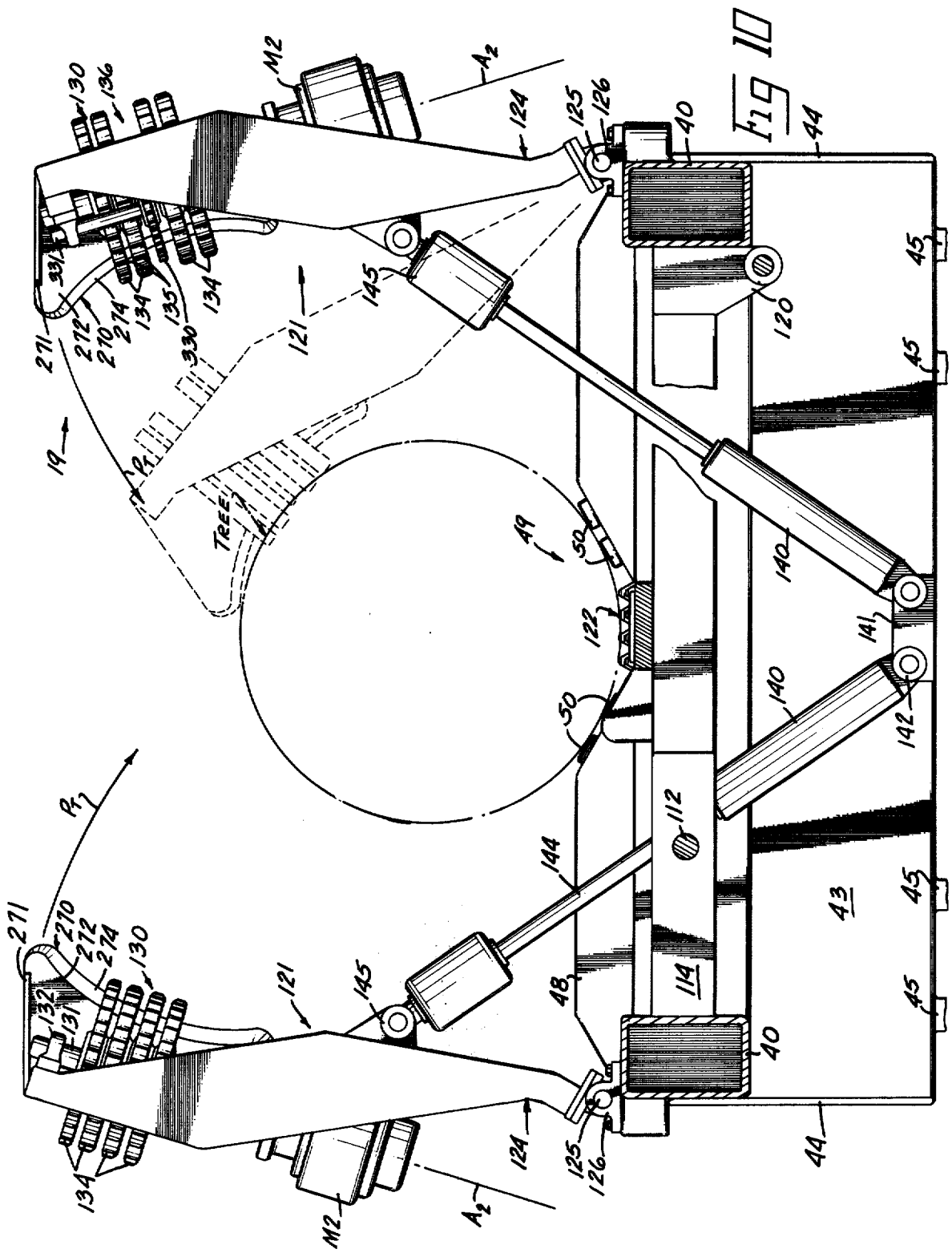

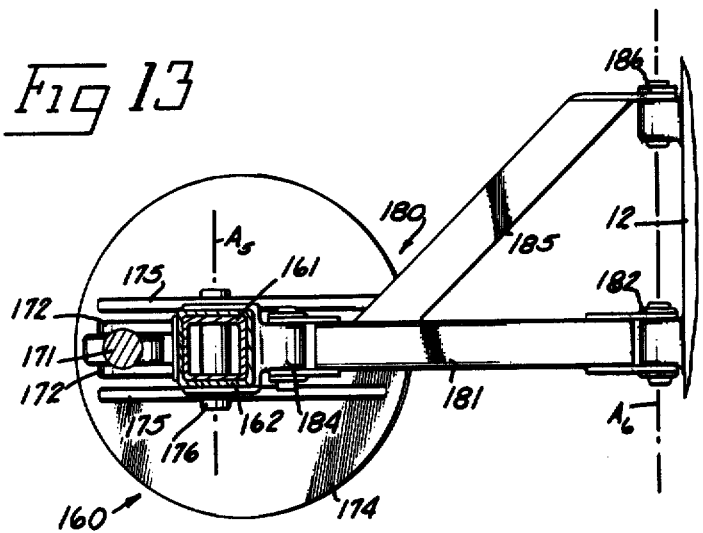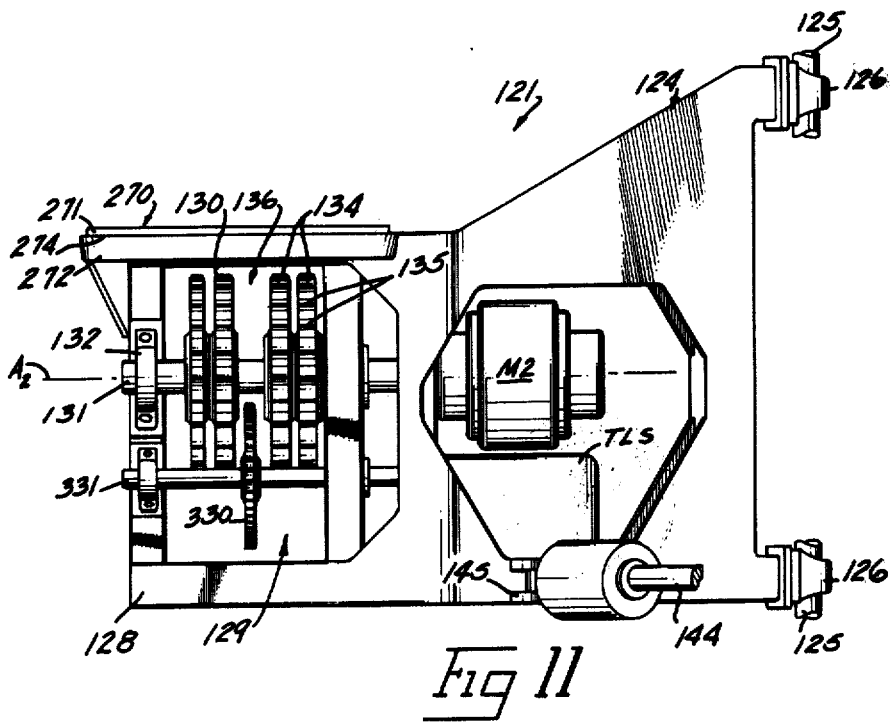

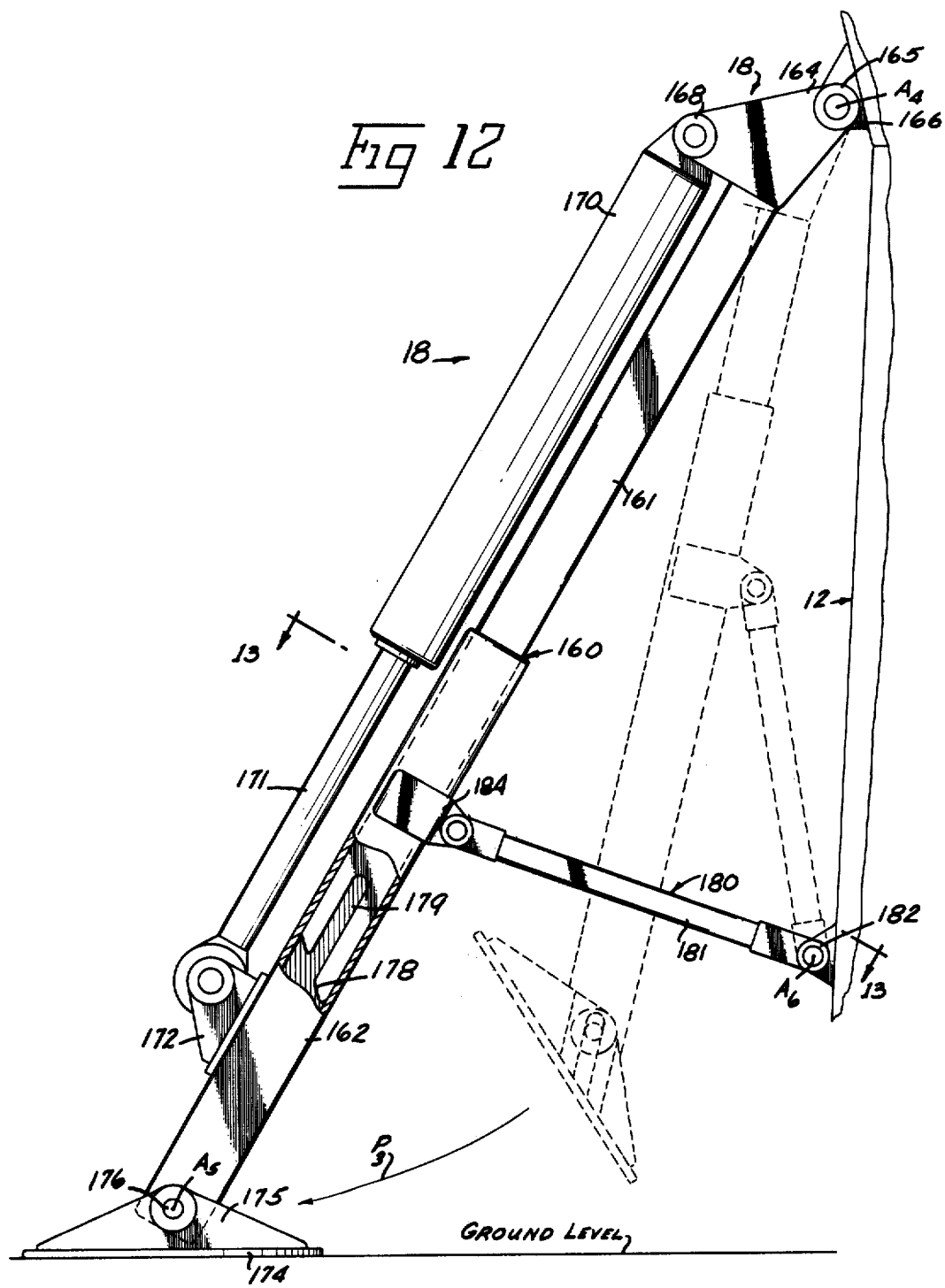

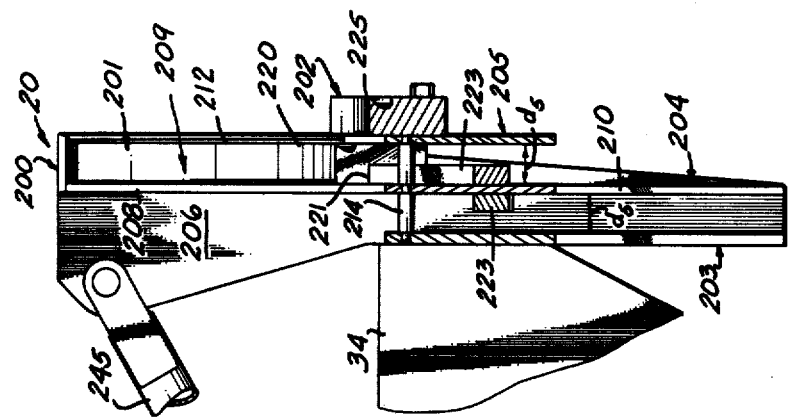
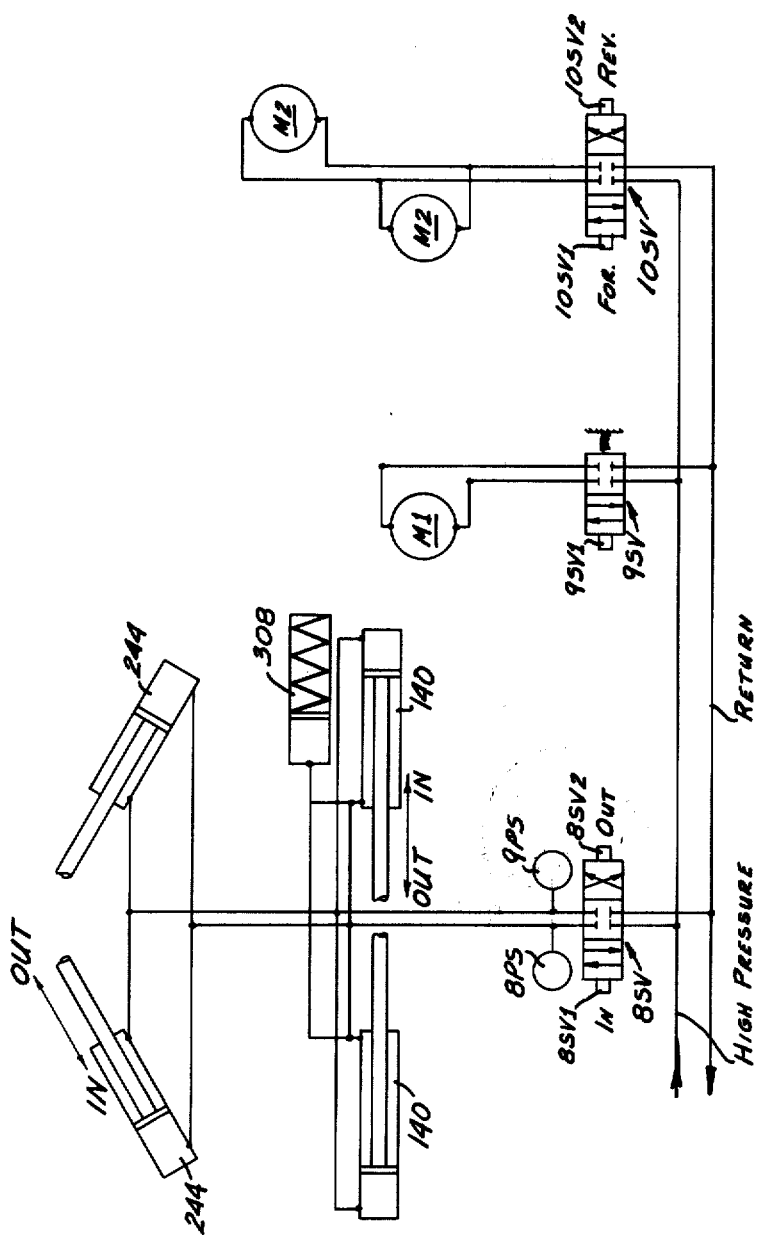

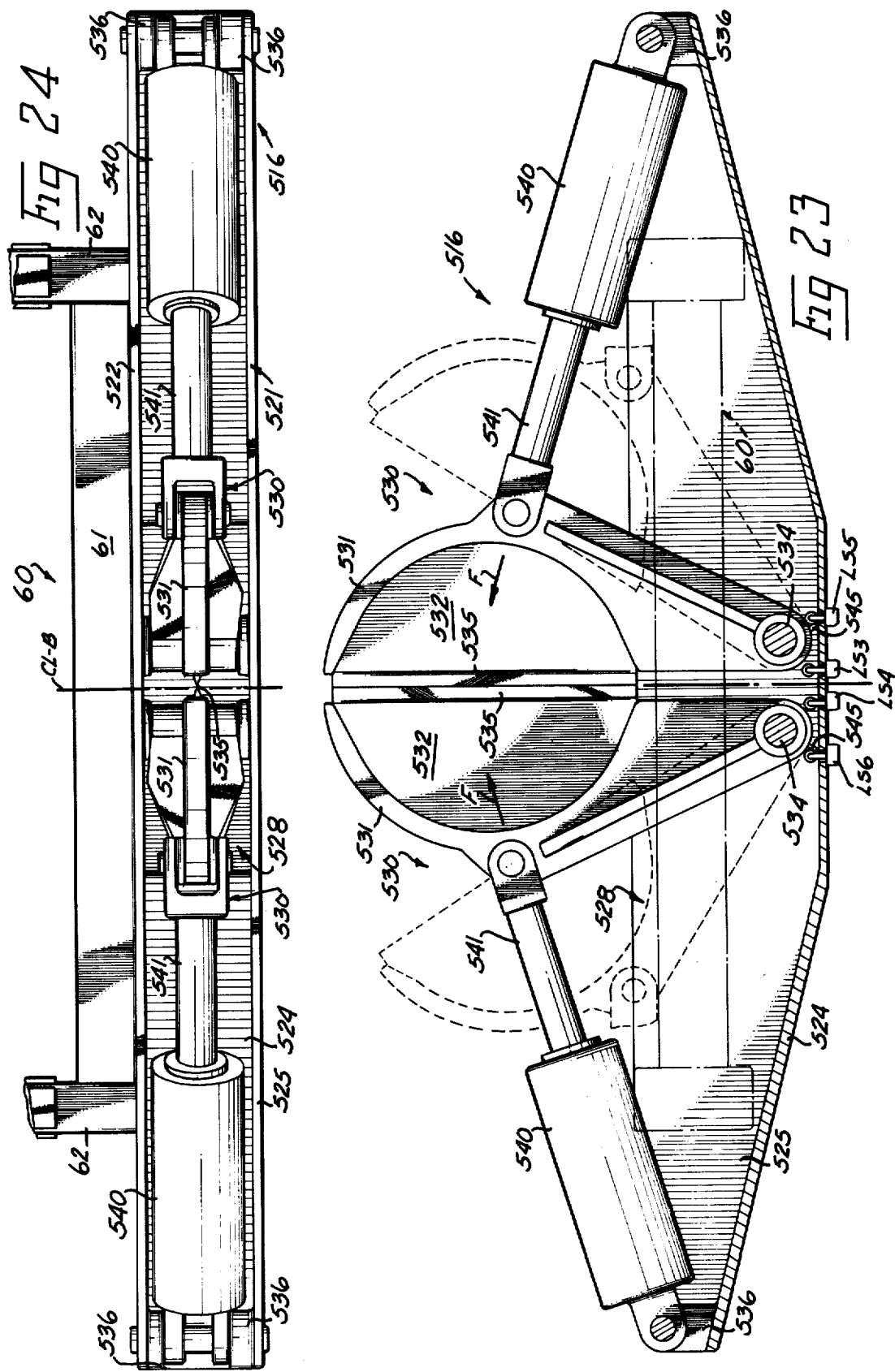

3,881,533

TREE HARVESTER

BACKGROUND OF THE INVENTION

Tree harvesting machines are available on the market today which perform one or more of the following operations: felling, delimbing and bucking of trees. One of the problems with these prior art tree harvesting machines was that they were extremely large in size and complicated in construction thereby rendering them prohibitively expensive to construct and maintain. Moreover, the bulkiness of the machine and the lack of maneuvarability of the machine substantially precluded the use of the machine when selective harvesting of trees was desired. Also, once a tree was felled, the prior art machines generally were unable to maneuver with the felled tree before processing was complete.

SUMMARY OF THE INVENTION

These and other problems and disadvantages associated with the prior art are overcome by the invention disclosed herein by providing a tree harvesting machine that is small and compact with a high degree of maneuvarability. Moreover, the invention is simple in construction, operation and maintenance and capable of automatic operation for rapidly felling, delimbing and bucking trees. Once the tree is felled, the machine with the tree thereon can be easily maneuvered prior to processing of the tree.

The machine includes generally a prime mover capable of turning in a short radius with a relatively short support frame as compared to the prior art mounted on the prime mover. A main support bed is pivotally mounted at its upper end to the forward end of the frame for pivoting from a vertical position in which the lower end thereof is near the ground to a horizontal position above the prime mover. The support bed is equipped with a set of holding clamps for holding a tree stationary with respect to the bed. A cutting assembly is mounted on the end of the bed opposite its pivoted end and movable with the bed as well as with respect to the bed for selectively felling trees and cutting them into selected lengths. A traversing drive assembly is carried by the bed and frame and selectively engagable with a tree on the bed for driving the tree longitudinally thereacross. An adjustable delimbing mechanism is carried by the bed and frame for selectively delimbing the tree as it is driven by the traversing drive assembly. Topping means is provided for shearing the top from the tree. Automatic control means is provided for controlling the operation of the bed, clamps, cutting assembly, traversing drive assembly, delimbing assembly, and topping means.

These and other features and advantages of the invention will become more apparent upon consideration of the following specification and accompanying drawings wherein like characters of reference designate corresponding parts through the several views and in which:

BRIEF DESCRIPTION OF THE DRAWINGS

FIG. 4 is a rear elevational view of the machine of FIG. 1;

FIG. 5 is an enlarged cross-sectional view of one of the side members of the bed showing the arrangement of the cutting assembly positioning means;

FIG. 6 is an enlarged cross-sectional view of the bed alignment switch mechanism taken along line 6—6 in FIG. 3;

FIG. 7 is a cross-sectional view illustrating the cutting assembly taken along line 7—7 in FIG. 3;

FIG. 9 is a cross-sectional view of the clamping mechanism taken along line 9—9 in FIG. 3;

FIG. 10 is a cross-sectional view showing the traversing mechanism and is taken along line 10—10 in FIG. 3;

FIG. 11 is an elevational view of one of the drive units of the traversing mechanism and is taken along line 11—11 in FIG. 3;

FIG. 12 is an elevational view of one of the outriggers;

FIG. 13 is a cross-sectional view of the outrigger taken along line 13—13 in FIG. 12;

FIG. 15 is a cross-sectional view of the delimber unit taken along line 15—15 in FIG. 14;

FIG. 19a is a continuation of the hydraulic schematic diagram of FIG. 19.

FIG. 23 is a view similar to FIG. 7 showing an alternate embodiment of the cutting assembly; and, FIG. 24 is a front elevational view of the cutting assembly of FIG. 23.

These figures and the folloiwng detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Figure 1:
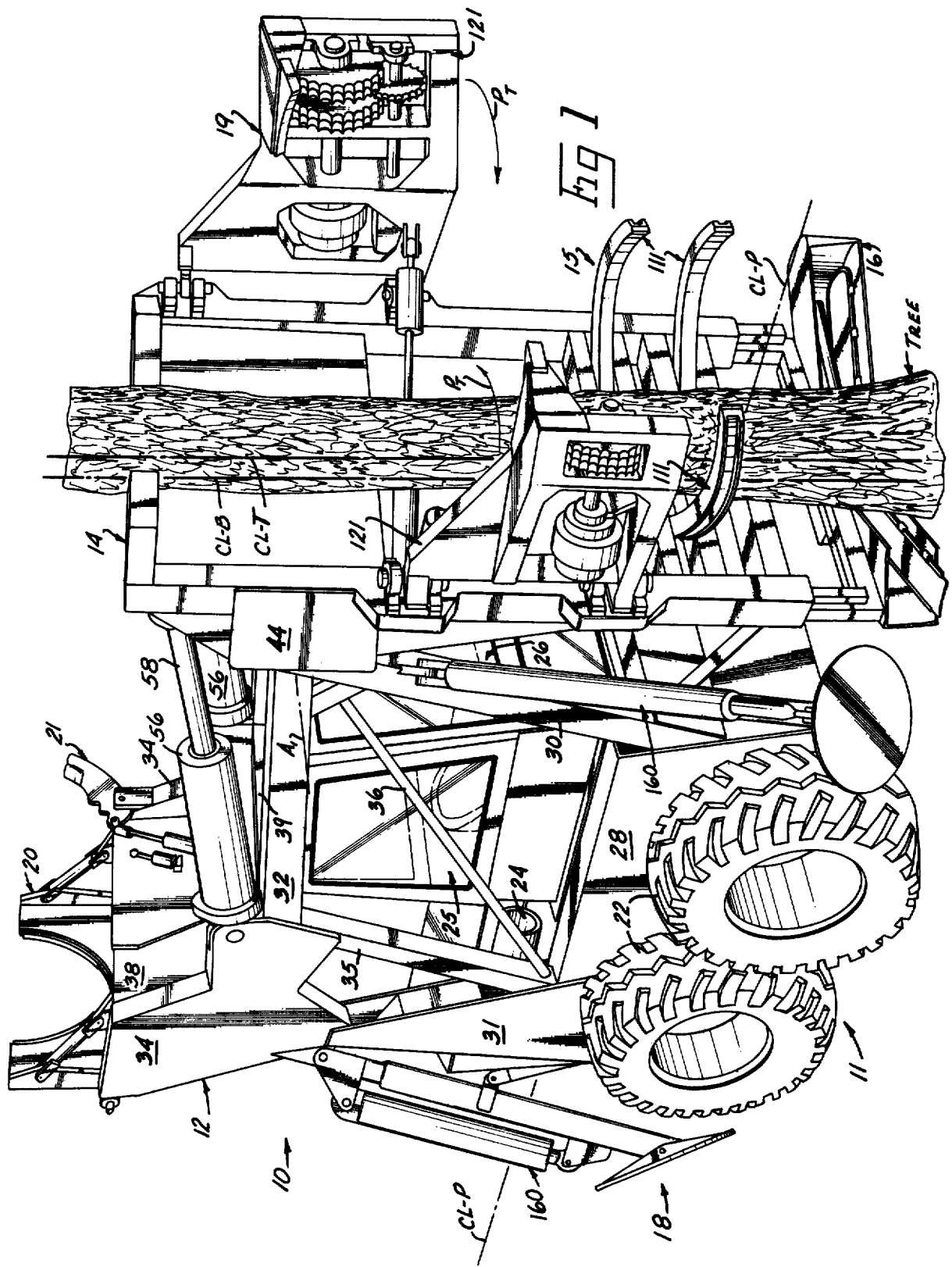
FIG. 1 is a perspective view of the machine embodying the invention.

Referring primarily to FIG. 1, the tree harvesting machine 10 includes generally a prime mover 11 having a support frame 12 thereon. A bed 14 is pivoted at its upper end to the support frame 12 and movable from a vertical position in front of the prime mover 11 to a horizontal position in alignment with the upper level of frame 12. A clamping mechanism 15 is carried by bed 14 adjacent the extending end thereof to hold a tree onto the bed 14 and a cutting assembly 16 is movably carried by the extending end of bed 14 for felling the tree on the bed and cutting it into selected lengths. A stabilizing outrigger means 18 is mounted on the support frame 12 for stabilizing the machine 10 when deployed and a traversing mechanism 19 is provided for moving the tree on the bed 14 lengthwise. A delimber unit 20 is mounted on the upper rear end of the support frame 12 to receive the tree trunk when the bed 14 is horizontal and for delimbing the tree as the traversing mechanism 19 moves the tree lengthwise. A topper 21 is mounted on the support frame 12 just forward of the delimber unit 20 to cut the top from the tree.

The bed 14 is arranged so that its longitudinal centerline CL-B is always in vertical alignment with the longitudinal centerline CL-P of the prime mover 11. This maintains vertical alignment between the centerline CL-T of the tree and centerline CL-P of the prime mover to balance the machine 10.

The prime mover 11 is driven toward the tree with the bed 14 in its down or vertical position until the tree trunk rests against the bed 14. The clamping mechanism 15 is activated to tightly clamp the tree against the bed. The outrigger means 18 is deployed to stabilize the machine and to urge the tree upwardly. The cutting assembly 16 is operated to fell the tree and the bed 14 with the tree thereon is pivoted to its upper horizontal position so that the trunk is operatively associated with the delimber unit 20 and the traversing mechanism 19 is moved into operative association with the tree trunk. The clamping mechaniam 15 is released and the traversing mechanism 19 is operated to move the tree longitudinally of the bed 14. The delimber unit 20 is operated during traversing of the tree to delimb same. The traversing mechanism 19 may be intermittently stopped and the cutting assembly 16 operated to cut the tree into selected lengths. When the diamter of the tree trunk reaches a predetermined minimum diameter, the topper 21 is operated to shear the top out of the tree and allow the rest of the trunk to be processes.

PRIME MOVER

The prime mover 11 has four wheels 22 arranged on a short wheelbase. The wheels 22 on opposite sides are independently driven by hydraulic motors from a hydraulic pump (not shown). A diesel engine 24 drives the pumps and the wheels on each side are independently driven. This arrangement is commonly referred to in the industry as a hydrostatic drive and allows the prime mover to turn in its own length thus rendering it highly maneuverable. Such prime movers are commercially available such as that disclosed in U.S. Pat. No. 3,635,365. An operator's cab 25 is provided on the prime mover 11 with appropriate controls 26 for operating the machine as will become appatent.

SUPPORT FRAME

The support frame 12 is mounted on the base 28 of the prime mover 11 and extends upwardly therefrom. The frame 12 includes a pair of spaced apart support beams 30 mounted on the front end of base 28 and extending upwardly therefrom so that their uppermost ends are spaced forwardly of the base 28. A pair of upstanding support pillars 31 are mounted at the rear end of base 28 and extend upwardly. A pair of side rails 32 are attached to the upper ends of the pillars 31 through a pair of connectors 34. A pair of braces 35 connect the lower ends of pillars 31 with the forward ends of connectors 34 and a pair of cross-braces 36 connect the lower ends of braces 35 with the juncture of rails 32 and beams 30. A bulkhead 38 connects connectors 34 to maintain the spacing therebetween and cross members 39 connect the side rails 32 to maintain the spacing therebetween.

BED

Figure 2:
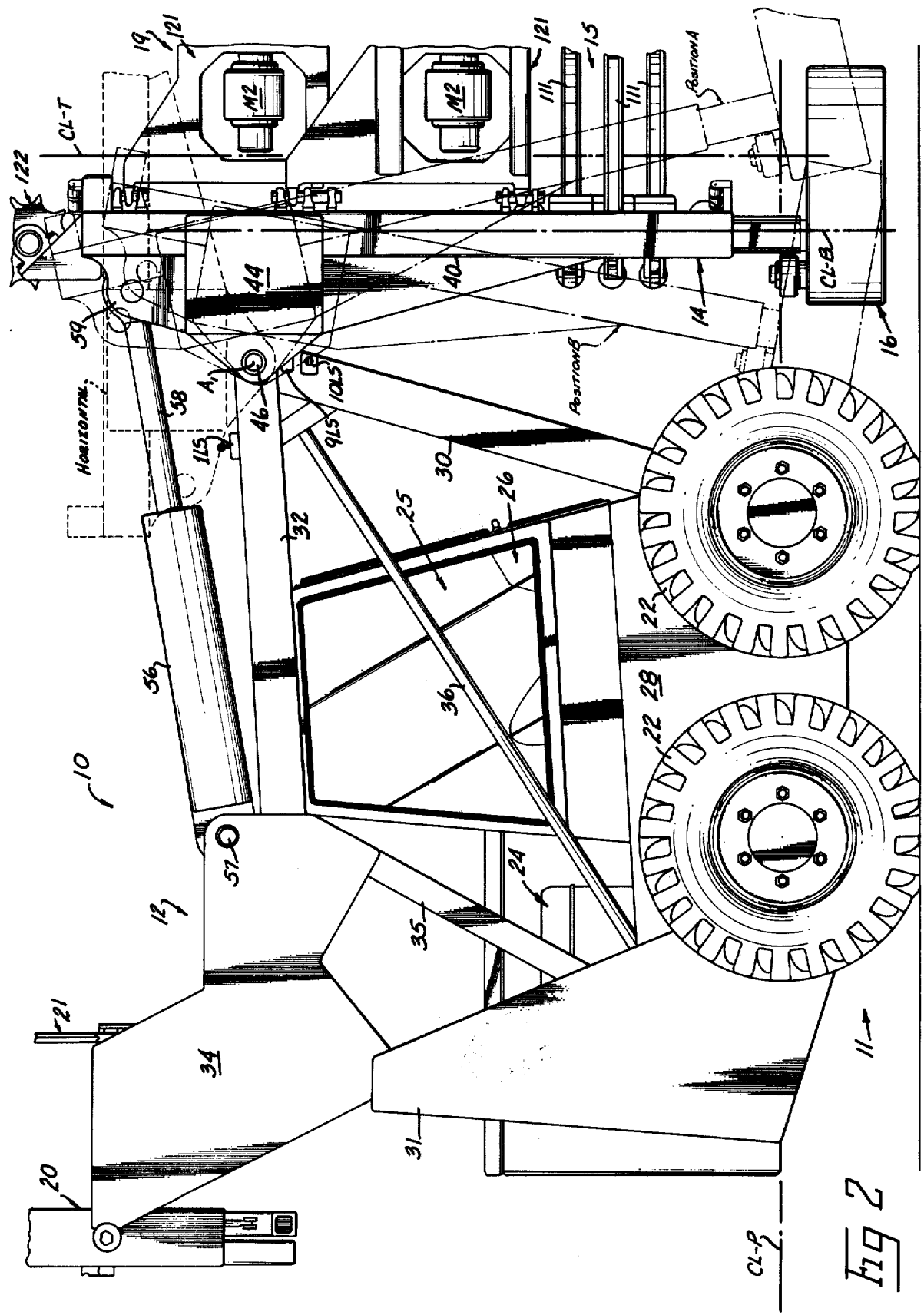
FIG. 2 is a side elevational view of the machine of FIG. 1 with the outriggers ommitted for clarity.
Figure 3:
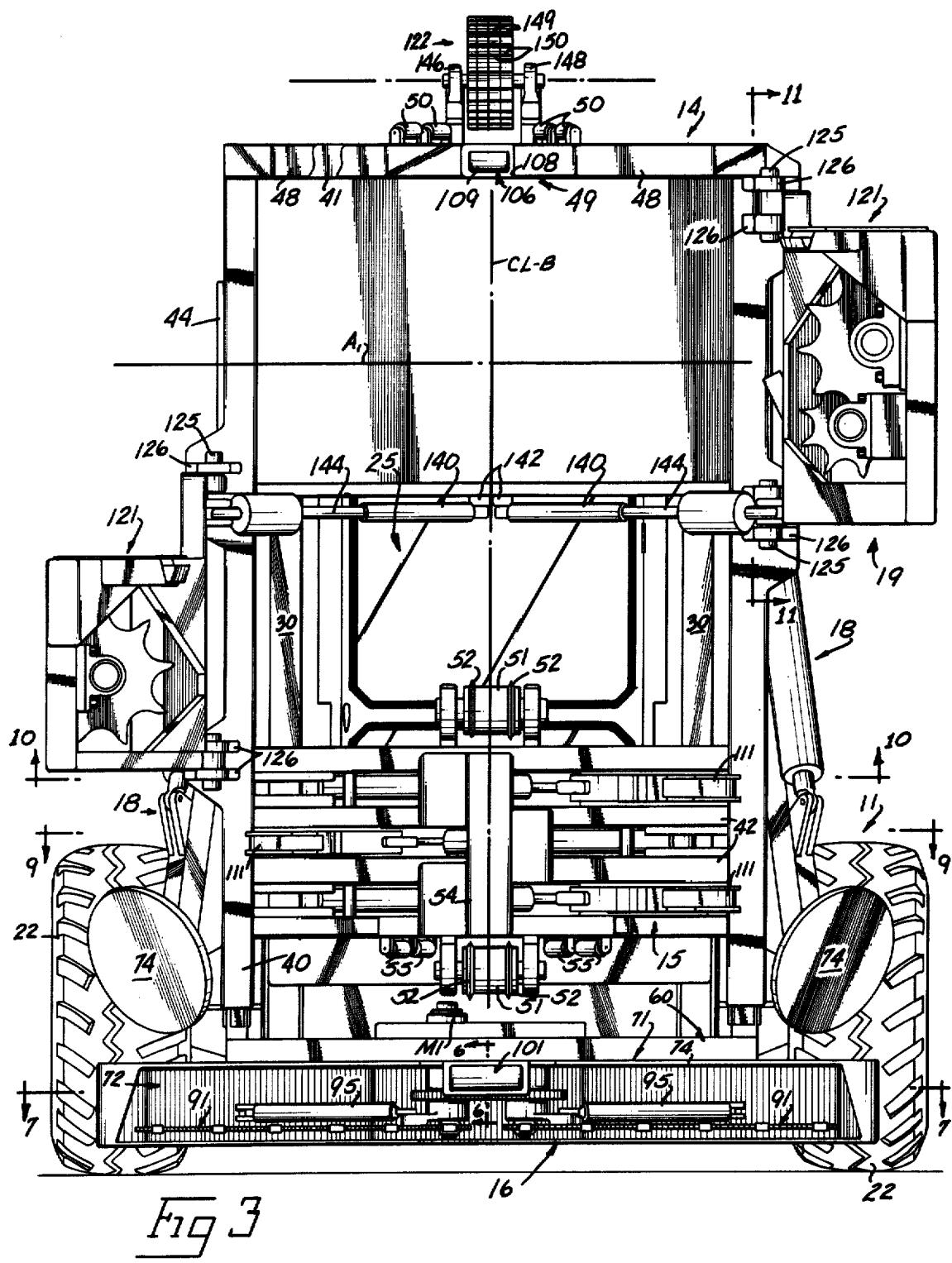
FIG. 3 is a front elevational view of the machine of FIG. 1.

The bed 14 as best seen in FIGS. 1-3 is generally rectangular in shape and includes a pair of tubular side members 40 joined at their upper ends by an end member 41. A plurality of parallel clamp supports 42 connect the side members 40 adjacent their other ends to support the clamping mechanism 15 as will be explained and intermediate cross braces 43 between side members 40 reinforce same. Rearwardly facing hinge supports 44 are provided on the tubular side members 40 and each is provided with a pair of pivot ears 45 a prescribed distance below end member 41 which fit over the forward-most ends of side rails 32. A pivot shaft 46 pivotally connects the ears 45 and thus bed 14 to the rails 32 so that bed 14 may be positioned in a generally vertical position with its lower end adjacent the ground as seen in FIG. 2 or in a generally horizontal position as seen in dashed lines in FIG. 2.

The upper end of bed 14 is provided with a pair of forwardly facing abutments 48 as seen in FIG. 2 which define a tree passage channel 49 therebetween. Guide rollers 50 are provided on abutments 48 on opposite sides of channel 49 to assist in guiding the tree across bed 14. A knife edge roller 51 is rotatably mounted on the top clamp support 42 as best seen in FIG. 3 and is provided with a pair of spaced apart sharpened annular flanges 52 for engaging the tree trunk and maintaining its alignment as it traverses bed 14. A skid plate 54 is attached to the forwardly facing sides of the clamp supports 42 aligned with the centerline CL-B of bed 14 to co-operate with the clamping mechanism 15 to hold the tree onto the bed 14. A set of guide rollers 55 and another knife edge roller 51 are mounted below the lower clamp support 42 as seen in FIG. 3 to guide the tree during its traverse of the bed 14.

For positioning the bed 14, a pair of main fluid cylinders 56 are pinned to connectors 34 by pivot pins 57 and have their piston rods 58 pinned to the upper end of bed 14 through a joint 59. As the piston rods 58 are retracted, the bed 14 is pivoted up to its horizontal position shown in dashed lines in FIG. 2 about the axis $A_1$ of pivot shaft 46 and is pivoted down to its vertical position shown in solid lines in FIG. 2 as rods 58 are extended.

For controlling the operation of cylinders 56 as the bed 14 is tilted downwardly, a maximum auto limit switch 9LS is mounted on the forwardmost edge of the beam 30 as seen in FIG. 2 and is operated by the hinge support 44 when the bed 14 reaches "Position A" in FIG. 2 shown in phantom lines. This positions bed 14 so that the lower end thereof is forwardly of the upper end. A maximum manual limit switch 10LS is also mounted on the beam 30 as seen in FIG. 2 and is operated by the hinge support 44 when bed 14 reaches "Position B" also shown in phantom lines in FIG. 2. The operation of these switches 9LS and 10LS will be more fully explained.

For automatically orienting bed 14 so that the tree will be in contact with both the top and bottom of bed 14, a lower aligning switch assembly 101 is provided as best seen in FIGS. 3 and 6. Assembly 101 is mounted on the cutting assembly 16 and includes a housing 102 which movably mounts a forwardly projecting curved switch actuator 104. A coil spring 105 constantly urges the actuator 140 toward its forward-most position. A switch 11LS is depressed against spring 105 by the tree to cause the bed 14 to be pivoted rearwardly from Position A toward Position B.

An upper aligning switch assembly 106 is mounted on the bed 14 between the abutments 48 and includes a housing 108 with its front flush with bed 14. A forwardly projecting curved switch actuator 109 is slidably mounted in housing 108 as seen in FIGS. 3 and is constantly spring urged toward its forward-most position. A switch 12LS is operated when the actuator 109 is depressed against the spring by the tree to cause the pivoting of bed 14 rearwardly toward Position B to be stopped since the tree is now aligned with bed 14. The operation of switches 11LS and 12LS will be more fully explained.

CUTTING ASSEMBLY

The cutting assembly 16 is movably mounted on the lower end of bed 14 as seen in FIGS. 3, 5, 7 and 8. That embodiment of assembly 16 seen in these figures uses saws. Referring to FIG. 3, the assembly 16 includes a carriage 60 having a U-shaped construction. Carriage 60 includes an elongate undercarriage 61 having upstanding posts 62 at opposite ends thereof. Posts 62 are arranged in registration with the open passage in the lower ends of tubular side members 40 as seen in FIG. 5. The posts 62 extend up into the passage in side members 40 and are provided with slide strips 64 on the sides thereof to guide the movement of posts 62 in the side members 40.

A positioning means 65 is provided for selectively varying the position of the cutting assembly 16 with respect to the bed 14. The positioning means 65 includes a fluid cylinder 66 mounted within each side member 40 above the upper end of the posts 62 on a pin 68 through the side member 40. The piston rod 69 of each fluid cylinder 66 is pinned to the top of the associated post 62 through the joint 70 as best seen in FIG. 5. Thus, the position of the undercarriage 61 may be selectively varied with respect to the lower end of bed 14 as will become apparent. It will also be noted that undercarriage 61 is always maintained generally perpendicular to the centerline CL-B of bed 14.

A generally V-shaped housing 71 is mounted on the underside of undercarriage 61 with a forwardly facing recess 72 defined therein. The housing 71 has a top and a bottom generally V-shaped wall 74 and 75 which are spaced apart and joined by a rear wall 76 to define the recess 72. The housing 71 has a central straight portion 78 and a pair of diverging leg portions 79. While the angle $\alpha$ between the leg portions 79 and central portion 78 may vary, one angle $\alpha$ of approximately 12° has been found satisfactory. This causes the forwardly projecting ends of leg portion 79 to extend forwardly of the bed 14. The bottom wall 75 of the housing 71 may have a centrally located arcuate cutout 80 therein to insure tree clearance as seen in FIG. 7.

Figure 8:
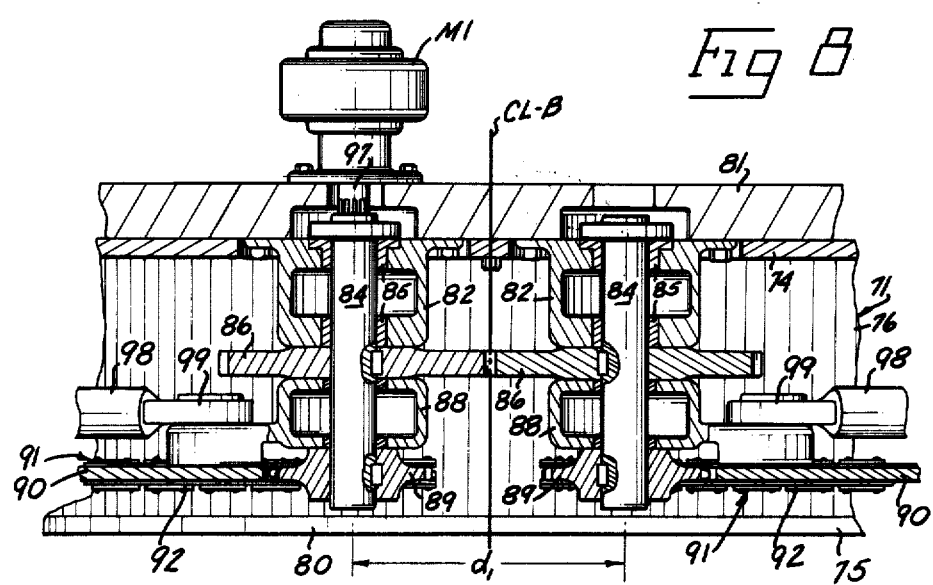
FIG. 8 is an enlarged cross-sectional view of the saw drive arrangement taken along line 8—8 in FIG. 7.

A motor mount 81 is centrally located on top of housing 71 as seen in FIG. 8 and carried by undercarraige 61 on the rear side thereof. A pair of annular bosses 82 are mounted within the central portion 78 of housing 71 a prescribed distance $d_1$ apart and centered on opposite sides of the centerline CL-B of bed 14. The bosses 82 depend below the motor mount 81. A stub shaft 84 is centrally mounted in each boss 82 on bearings 85 and protrude therebelow. A gear 86 is mounted on each stub shaft 84 below bosses 82 in mesh with each other so that as one stub shaft 84 is rotated, the other stub shaft 84 will be oppositely and synchronously rotated. A spaced 88 is rotatably mounted on each stub shaft 84 below gear 86 for rotation independently of shaft 84 as will be further explained. A drive sprocket 89 is attached to the lower end of each shaft 84 below spacer 88 for rotation with shaft 84. The drive sprockets 89 are of the type used to drive a chain-type saw as will become apparent and lie in a common plane.

A tool bar 90 is attached to each spacer 88 and lies in the plane of sprockets 89. An endless chain type saw 91 is carried on each tool bar 90 around the periphery thereof and in mesh with sprocket 89 for selectively driving same. Each saw 91 includes an endless link support chain 92 having spaced teeth 94 mounted on and projecting outwardly of chain 92. As saw 91 is moved around the periphery of tool bar 90 by sprocket 89, the teeth are moved to cut the tree. The adjacent edges 93 of tool bars 90 are parallel to each other and spaced a prescribed distance $d_2$ apart when the tool bars 90 are pivoted in toward each other as shown by solid lines in FIG. 7. The distance $d_2$ is substantially equal to twice the distance the chain 92 projects beyond the edge 93 of bar 90 plus the distance the teeth 94 project beyond the chain 92. Thus, when the tool bars 90 are in the position shown in solid lines in FIG. 7, the teeth 94 on opposite chains 92 overlap to insure that the tree is completely cut. The gears 86 maintain synchronization between chains 92 so that the spacing between the teeth 94 is offset so as not to interfere with each other.

The pivotal position of the tool bars 90 is controlled by a pair of fluid cylinders 95, one controlling each bar 90. Each cylinder 95 is pinned within the leg portion 79 of housing 71 associated with the particular tool bar 90 through a joint 96. The piston rod 98 of cylinder 95 is pinned to its associated tool bar 90 through a connection 99 adjacent spacer 88. Thus, as piston rods 98 are extended, the tool bars 90 are moved in toward each other and moved out away from each other as the piston rods are retracted. When the tool bars 90 are fully out, they lie within the recess 72 in housing 71 as shown by dashed lines in FIG. 7.

A switch lug 100 is provided on each of the spacers to control the limits of movement of tool bars 90. "In" limit switches 3LS and 4LS are engaged when the tool bars 90 are fully in toward each other as shown in FIG. 7 by solid lines and "out" limit switches 5LS and 6LS are engaged by lugs 100 when the tool bars 90 are fully out away from each other and within the recess 72 as shown by dashed lines in FIG. 7. The operation of switches 3LS through 6LS will be more fully explained.

A hydraulic motor M1 is mounted on the motor mount 81 and the depending drive shaft 97 thereof is coupled to one of the stub shafts 84 to drive the chain saws 91 around the periphery of tool bars 90. Thus, when the motor M1 is driving the chain saws 91 and the fluid cylinders 95 operated to move the tool bars 90 in toward each other, a tree on bed 14 will be severed.

CLAMPING MECHANISM

The clamping mechanism 15 is best seen in FIGS. 1, 3 and 9 and serves to selectively clamp the tree trunk onto the bed 14. Mechanism 15 includes a plurality of curved clamping arms 111 pivotally mounted on opposite sides of the centerline CL-B of bed 14 between the clamp supports 42 so that when the arms 111 are moved toward each other the tree trunk will be clamped and held between arms 111 and the skid plate 54. Three arms 111 are illustrated, however, it is to be understood that the number used may be varied without departing from the scope of the invention. One arm 111 is mounted on one side of bed 14 while two arms are mounted on the opposite side so that the force of the arms on the tree holds the tree centered on the bed 14 even though the arms 111 are offset.

Because the arms 111 and their associated controls are the same, only one arm 111 and its controls will be described in detail with like numbers of reference being applied to the other arms and controls. As best seen in FIG. 9, the arm 111 is pivoted on a pivot shaft 112 through the supports 42 with a bearing plate 114 above and below arm 111. The forwardly projecting tree engaging end 115 of arm 111 is appropriately curved to exert a resultant force on the tree trunk in conjunction with the other arms 111 toward the bed 14 without regard to tree diameter. The rearwardly projecting end 116 of arm 111 is pinned to the piston rod 118 of a positioning fluid cylinder 119. The cylinder 119 is pivoted to a rearwardly extending mounting bracket 120 on the opposite side of bed 14. Thus, as piston rod 118 is extended, the tree engaging end 115 of arm 111 will be moved in toward bed 14 and vice versa. The control of the fluid cylinders 119 will be explained in more detail later.

TRAVERSING MECHANISM

The traversing mechanism 19 is best seen in FIGS. 1, 2, 3, 10 and 11 and serves to move the tree lengthwise across bed 14 when bed 14 has been pivoted to a horizontal position. The mechanism 19 includes a pair of drive units 121 pivotally mounted on opposite side members 40 of bed 14 and an idler unit 122 mounted on top of end member 41 of bed 14. When the bed 14 is in its horizontal position, the tree trunk is engaged by the idler unit 122 and the drive units 121 are pivoted to engage the tree trunk for traversing same.

Since the drive units 121 are generally mirror images of each other, only the upper right unit will be described in detail with like reference numbers applied to the other drive unit 121. It will also be noted that the units 121 are longitudinally spaced from each other along the bed 14 to prevent interference with each other.

The drive unit 121 includes a frame 124 having stub shafts 125 pivotally mounted in bearings 126 mounted on side members 40. The frame 124 has a forwardly offset portion 128 on the extending end thereof so that when the frame 124 is pivoted toward the bed 14 as shown in dashed lines in FIG. 10, the offset portion 128 will be spaced forwardly of bed 14 a prescribed distance as will be more fully explained. An opening 129 is defined through the offset portion 126.

Rotatably mounted in opening 129 is a drive sprocket unit 130. The unit 130 includes a drive shaft 131 rotatably mounted in bearings 132 carried by frame 124 so that the axis $A_2$ of shaft 131 is always substantially perpendicular to the centerline CL-B of bed 14. A plurality of drive sprockets 134 are ganged on shaft 131 within opening 129 and rotatable with shaft 131. Each sprocket 134 has sharpened peripheral teeth 135 for engaging the tree trunk to drive same lengthwise along bed 14. As best seen in FIG. 11 the sprockets 134 are ganged on shaft 131 in such a way as to provide a central gas 136 as will be explained. This gas 136 is only necessary in the upper unit 121 as will be apparent.

A hydraulic motor M2 is mounted on the base portion 138 of the frame 124 inwardly of the offset portion 128 and has its drive shaft 139 coupled to the shaft 131 for driving same. Because of the offset portion 128 good exposure of the teeth 135 on sprockets 134 is provided while the base portion 138 of frame 124 is inwardly of motor M2 to protect it.

A fluid cylinder 140 pinned to a mounting plate 141 on the lower side of the lowermost intermediate cross brace 43 of bed 14 through a joint 142 positions the unit 121. The piston rod 144 of cylinder 140 is connected to frame 124 through pinned joint 145 so that the unit 121 moves out away from bed 14 as rod 144 is extended and vice versa. The cylinder 140 is located so that sufficient clearance between it and the tree is maintained at all times.

The idler unit 122 includes a support shaft 146 freely rotatably journalled in bearing blocks 148 centrally mounted on top of end member 41 as seen in FIGS. 2 and 3. A plurality of sprockets 149 similar to sprockets 134 in units 121 are ganged on shaft 146 with sharpened teeth 150. The rotational axis $A_3$ of idler unit 122 is generally perpendicular to the centerline CL-B of bed 14 and the sprockets 149 are positioned so that the tree rests thereon when the bed 14 is in the horizontal position shown by dashed lines in FIG. 2 and does not contact the upper end of the bed 14. When the unit 121 are pivoted inwardly toward each other along path $P_T$, the tree trunk is supported between sprockets 134 and 149 as well as rollers 51 and 55. This allows the tree to be easily traversed over bed 14 as will be apparent.

OUTRIGGER MEANS

The outrigger means 18 serves to stabilize and level the prime mover 11 as well as raise the prime mover and bed 14 after the clamping mechanism 15 has clamped the standing tree against the bed 14. This exerts an upward force on the tree to prevent binding of the cutting assembly 16 as the tree is being cut.

The outrigger means 18 includes an outrigger 160 positioned at each corner of frame 12 and extending diagonally outward therefrom. Thus, there are four outriggers 160 all having the same general construction. Only one outrigger 160 will be described in detail with like reference numbers being applied to corresponding parts of all outriggers 160.

As best seen in FIGS. 1, 12, and 13, the outrigger 160 includes an inner support tube 161 having a generally square cross-section with an outer support tube 162 slidably carried on the lower portion of tube 161 in a telescoping relationship. The upper end of tube 161 is attached to a triangular shaped connector 164 with one of its ears 165 pinned to a bracket 166 mounted on the upper portion of the corner of frame 12 so that outrigger 160 pivots along a path $P_3$ in a vertical plane approximately 30° with respect to the longitudinal centerline CL-P of the prime mover 11. The other ear 168 of connector 164 is pinned to the end of fluid cylinder 170 for operating the outrigger 160.

The piston rod 171 of cylinder 170 is pinned to a driving ear 172 attached to the outer tube 162 intermediate its ends. Thus, as piston rod 171 is extended, the outer tube 162 is telescoped outwardly on the inner tube 161. A ground engaging plate 174 is pivotally attached to the extending lower end of the outer tube 162 by its upstanding mounting ears 175 and pivot pin 176. Plate 174 is generally disk shaped and is freely pivoted about the axis $A_5$ generally parallel to the pivot axis $A_4$ of the connector 164 and inner tube 161, so that it can align itself with the ground when deployed. The lower end of the inner tube 161 is cut at an angle as shown in the broken away portion in FIG. 12 to define an angular camming surface 178. A downwardly opening slot 179 is defined by inner tube 161 and extends upwardly from surface 178 so as to allow the pivot pin 176 to pass therein as the piston rod 171 and outer tube 162 are retracted. This permits the surface 178 to engage the upper surface of ground plate 174 to pivot it into an outwardly turned position as seen in FIG. 1 and by dashed lines in FIG. 12 to present a minimum frontal interfering area and allow greater maneuverability of the machine 10.

For controlling the deployment and retraction of outrigger 160, a spacer 180 as best seen in FIG. 13 is pivotally connected between frame 12 and outrigger 160. As the piston rod 171 is extended to telescope the outer tube 162 on tube 161, the space 180 causes the ground plate 174 to be moved outwardly along the path $P_3$ to enlarge the effective supporting area of machine 10 and thus stabilize same. The spacer 180 includes a support arm 181 pinned to the frame 12 through a joint 182 and to the outer tube 162 through a strap 184 attached to the tube intermediate its ends. A stabilizer 185 attached to arm 181 intermediate its ends is pinned to the frame 12 through joint 186 so that the connector 180 pivots about the common axis $A_6$ through joints 182 and 186 that is displaced below and aligned with axis $A_4$ of outrigger 160. Thus, when piston rod 171 is extended, the outriggers 160 are deployed until plates 174 engage the ground and exert an upward force on the machine 10. When piston rod 171 is retracted, the outrigger 160 is retracted up and back toward frame 12 to reduce the dimensions of the machine so as to render it more maneuverable.

DELIMBER UNIT

The delimber unit 20 is mounted at the rear of machine 10 on the connectors 34 of frame 12. This positions the delimber unit 20 is a spaced relationship to the bed 14 so that when a tree is carried by the bed 14 and pivoted to a horizontal position, the tree trunk rests in the delimber unit 20. As the traversing mechanism 19 moves the tree forward, the delimber unit 20 removes the limbs from the tree.

The delimber unit 20 as best seen in FIGS. 1, 4, 14 and 15 includes generally a housing 200 mounted between the connectors 34 at the rear ends thereof. A pair of movable delimber blades 201 are carried in housing 200 along with a fixed delimber blade 202. The fixed delimber blade 202 is positioned below and supports the tree trunk while the movable blades 201 are moved into contact with the tree trunk so that as the traversing mechanism 19 moves the tree forward, the limbs will be sheared therefrom.

The housing 200 includes a front support plate 203, an intermediate support plate 204, and a rear support plate 205. The support plates 203, 204, and 205 are mounted in a longitudinally spaced apart arrangement with respect to the frame 12 and generally perpendicular to the longitudinal centerline CL-P of the prime mover 11 by a pair of upstanding side members 206 pivotally mounted intermediate their ends on the rear ends of connectors 34. The side members 206 space the plates 203, 204, and 205 a distance $d_5$ apart as will be explained. The intermediate plate 204 is a generally X-shaped member with the upstanding legs 208 thereof forming an upwardly opening semi-circular opening 209 therebetween. The opening 209 has a diameter slightly larger than the maximum diameter tree to be processed. The outer ends of legs 208 as well as the outer ends of depending legs 210 of the plate 204 are attached to side members 206.

The front plate 203 corresponds to and is generally aligned with one set of aligned legs 208 and 210 forwardly of plate 204 so that plate 203 extends diagonally between and is attached to opposite side members 206. An arcuate cutout 211 is provided in the upper portion of plate 203 in alignment with that portion of opening 209 along which plate 203 extends.

The rear support plate 205 corresponds to and is generally aligned with the other set of aligned legs 208 and 210 rearwardly of plate 204 so that plate 205 extends diagonally between and is attached to opposite side members 206. An arcuate cutout 212 is provided in the upper portion of plate 205 in alignment with that portion of opening 209 along which plate 205 extends.

Figure 14:
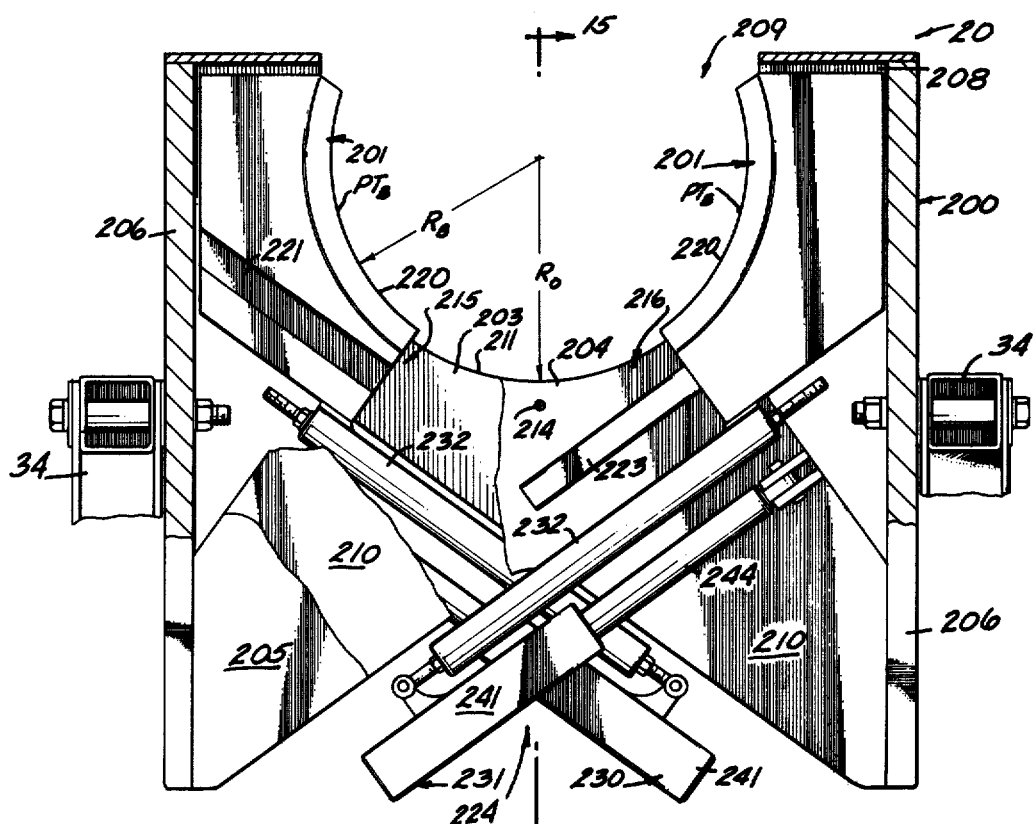
FIG. 14 is a rear elevational view of the delimber unit with portions thereof broken away and portions thereof shown in cross-section to illustrate the internal construction thereof.

A central spacer 214 is positioned through plates 203, 204, and 205 at a common overlapping position to maintain the spacing therebetween. Thus, a left blade chamber 215 as seen in FIG. 14 is defined between front plate 203 and intermediate plate 204 which opens into the central opening 209 and a right blade chamber 216 is defined between intermediate plate 204 and rear plate 205 which opens into the central opening. The left movable delimber blade 201 is movably carried in left chamber 215 so as to selectively project into the opening 209. The right movable delimber blade 201 is movably carried in right chamber 216 so as to selectively project into the central opening 209 opposite the left blade 201 to engage the tree and delimb same as it is traversed forward by the traversing mechanism 19.

The blades 201 are mirror images of each other so only the left blade 201 as seen in FIG. 14 will be described in detail with like reference numbers applied to the right blade 201. As seen in FIGS. 4, 14 and 15, the left blade 201 is a relatively thick generally triangular shaped member with that side which projects into the central opening 209 defining a concave arcuate rearwardly facing cutting edge 220. The cutting edge 220 has a radius of curvature $R_B$ slightly less than the radius $R_o$ of opening 209 so that when blade 201 is fully retracted into chamber 215, the cutting edge 220 will project into opening 209 concentrically therewith.

A guide recess 221 is defined along the lower portion of blade 201 generally parallel to the path of the tangent contact point $PT_B$ between the cutting edge 220 and the tree trunk which remains the same regardless of the position of blade 201. A guide 223 is provided on the intermediate plate 204 which engages blade 201 in recess 221 to support same as the blade 201 is slidably moved therealong. A drive pin 222 depends from the lower edge of blade 201 and protrudes out the open bottom of chamber 215 to be engaged by a positioning unit 224 as will be explained.

The fixed blade 202 is attached to the rear surface of rear plate 205 and defines an arcuate cutting edge 225 with a radius of curvature $R_B$. The blade 202 is centered between blades 201 and the cutting edge 225 is positioned to form a continuous cutting edge with the cutting edges 220 when blades 201 are fully retracted.

The positioning unit 224 includes a left subassembly 230 for positioning the left blade 201 and a right subassembly 231 for positioning the right blade 201. Since subassemblies 230 and 231 are similar in construction, only subassembly 230 will be described in detail with like reference numbers being applied to corresponding parts of subassembly 231.

Figure 16:
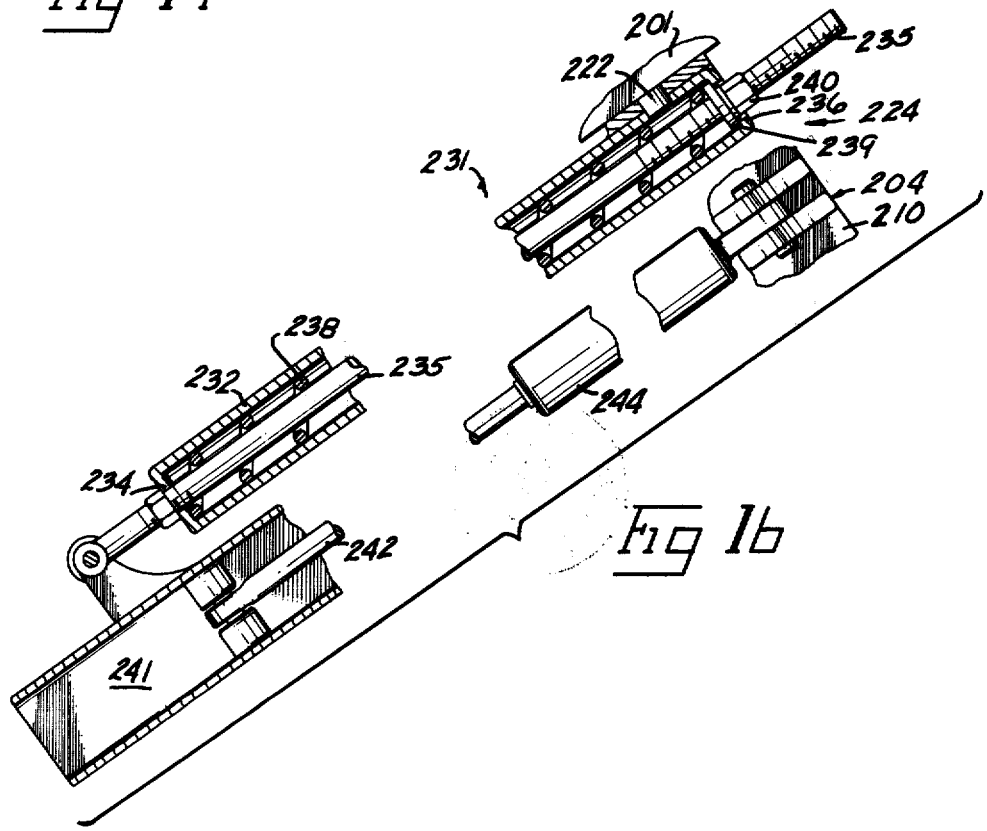
FIG. 16 is a longitudinal cross-sectional view of the positioning unit for the delimber.

As best seen in FIGS. 14 and 16, subassembly 230 includes a compression tube 232 attached to the drive pin 222 outside of chamber 215 so that tube 232 moves blade 201 therewith. The lower projecting end of tube 232 is provided with an abutment 234 which slidably receives a connecting rod 235 therethrough. The upper end of tube 232 is provided with an abutment 236 through which the rod 235 extends. A compression coil spring 238 is received between abutments 235 and 236 and a disc keeper 239 is positioned between abutment 236 and the upper end of spring 238. The upper end of rod 235 is slidably received through keeper 239 and is threaded to receive an adjusting nut 240 that connects rod 235 to keeper 239. The lower projecting end of rod 235 is pinned to a tubular guard 241 which is in turn attached to the piston rod 242 of fluid cylinder 244. The fluid cylinder 244 is pinned to housing 200 so that as piston rod 242 is extended, the blade 201 will be moved out into opening 209 and vice versa. The tube 232, spring 238 and rod 235 act as an accumulator to resiliently connect blade 201 with cylinder 244 so that piston rod 242 can be fully extended and blade 201 allowed to resiliently move to compensate for tree irregularities. It is to be understood that a hydraulic accumulator (not shown) may be substituted for the tube 232, spring 238 and rod 235 to produce the same result.

The housing 200 is held in place by a pair of stabilizers 245 as best seen in FIG. 1 to maintain the housing vertical. A support roller 246 is rotatably mounted just forwardly of housing 200 on the bulkhead 38 of frame 12 to relieve the weight of the tree on the bottom fixed delimber blade 202. Thus, when the bed 14 and tree are horizontal, the tree is supported by the roller 246, sprockets 149 in the idler unit 122 of the traversing mechanism 19, and the knife edge rollers 51 on the bed 14.

The delimber unit 20 also includes a rearwardly facing delimber subassembly 270 mounted on the upper edge of each of the frames 124 of the traversing mechanism 19. Each subassembly 270 includes a support bracket 271 attached to frame 124 with an arcuate shear blade 272 carried thereby. The blades 272 each have a sharpened rearwardly facing cutting edge 274 which lies adjacent the tree trunk when the sprocket unit 130 engages same to shear those limbs from the tree trunk that are not sheared by blades 201 and 202.

TOPPER

Figure 18:
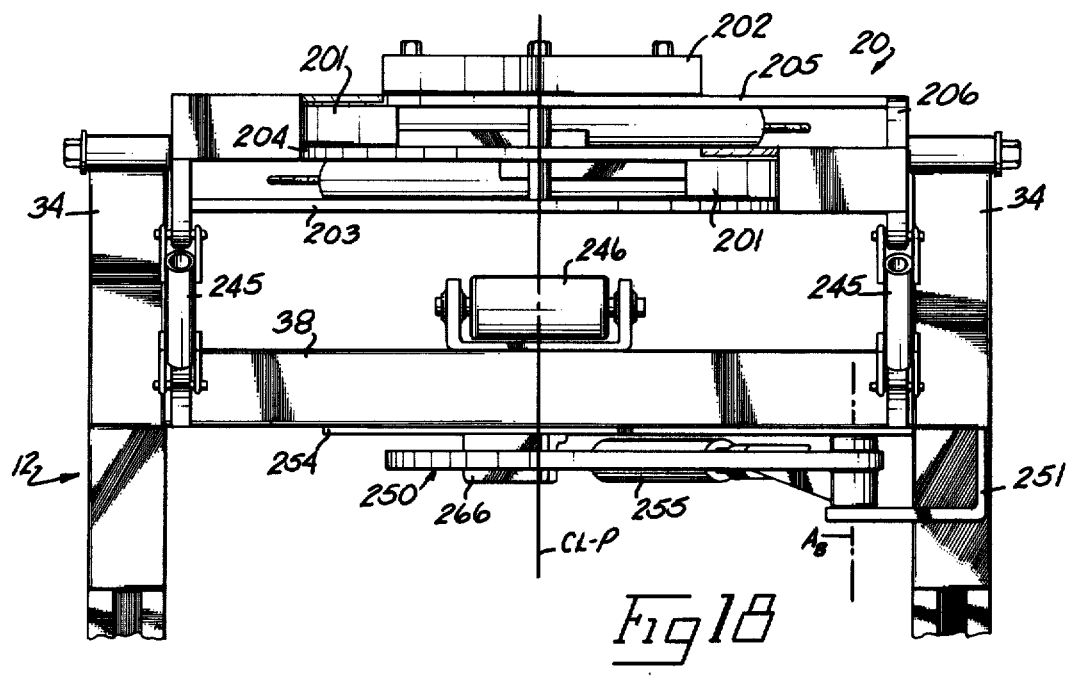
FIG. 18 is a top view of the topper.
Figure 17:
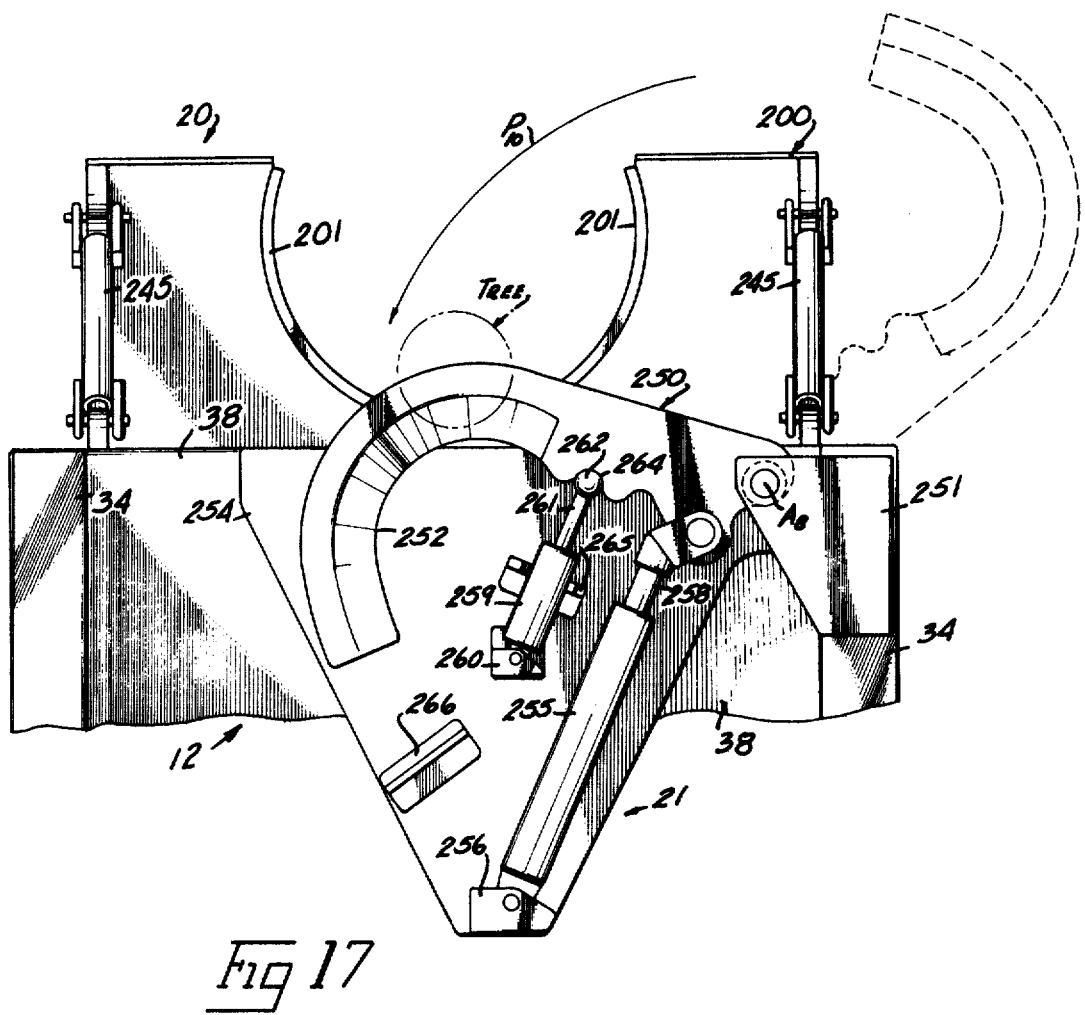
FIG. 17 is a front elevational view of the topper.

The topper 21 is mounted on the forward wall of bulkhead 38 of frame 12 as seen in FIGS. 17 and 18 and serves to shear the tree trunk just forward of the delimber unit 20 when the diameter of the tree trunk reaches a predetermined diameter or when it is desirable to remove an unprocessable portion of the tree. The topper 21 includes a curved shear blade 250 pivotally mounted by a support bracket 251 attached to bulkhead 38. The blade 250 pivots about an axis $A_8$ displaced laterally of and generally parallel to the centerline CL-P of prime mover 11. This positions blade 250 so that its concave arcuate cutting edge 252 is centered over the tree trunk as it is pivoted.

A generally triangular carriage plate 254 extends across bulkhead 38 from bracket 251 generally parallel to and spaced rearwardly of the plane of path $P_{10}$ along which blade 250 moves. A fluid cylinder 255 is pivoted in a clamp 256 on the lower edge of plate 254 and has its piston rod 258 pinned to blade 250 just inwardly of its pivotal connection with bracket 251. Thus, as piston rod 258 is retracted, the blade 250 is closed inwardly just forward of bulkhead 38 and vice versa. If a tree trunk is lying over bulkhead 38, the blade 250 will force the tree down against the bulkhead 38 and then shear same.

Because the closing of blade 250 is fast, a shock absorbing arrestor 259 of known construction is pivoted in bracket 260 on plate 254 with its arresting plunger 261 having a ball 262 on the projecting end thereof engagable with an appropriately formed recess 264 in the bottom edge of blade 250. A guide 265 is provided on plate 254 to locate ball 262 in alignment with recess 264. Thus, when blade 250 has sheared the tree trunk, the ball 262 is engaged to slow the rate of movement of blade 250 to an easily controlled level. A striker 266 is provided below the tip of the blade 250 to be engaged thereby after the arrestor 259 has been engaged to stop the movement of blade 250. A pressure switch 15RS is provided which is activated as the pressure builds up in cylinder 255 as a result of engagement with arrestor 259 to cause the blade 250 to open as will be explained.

HYDRAULIC SYSTEM

Figure 19:
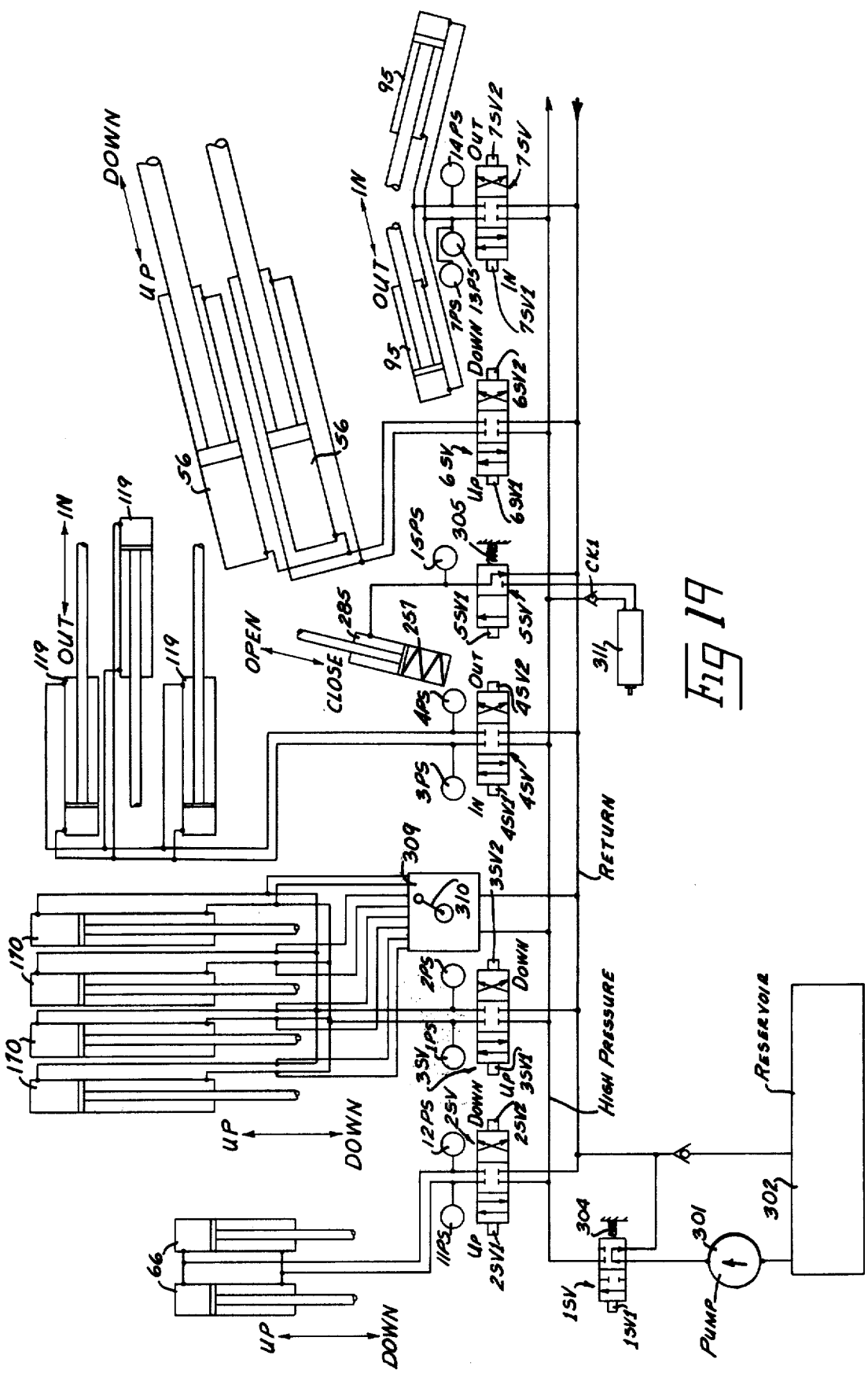
FIG. 19 is a hydraulic schematic diagram for the machine.

The hydraulic system 300 as seen in FIG. 19 includes a bank of solenoid hydraulic valves which connect the output of the secondary system drive pump 301 driven from the diesel engine of the prime mover 11 with the various system components. The output of pump 301 is connected to the system 300 by the dump solenoid valve 1SV. The various solenoid valves of the system and the cylinders they control are set forth in the following table:

| VALVE NO. | COMPONENT CONTROLLED |
|---|---|
| 2SV | Cylinders 66 (Height of cutting assembly 16) |
| 3SV | Cylinders 170 (Outrigger means 18) |
| 4SV | Cylinders 119 (Clamping mechanism 15) |
| 5SV | Cylinder 255 (Topper 21) |
| 6SV | Cylinder 56 (Bed 14) |
| 7SV | Cylinder 95 (Pivotal position of tool bars |
| 8SV | Cylinders 140 and 244 (Traversing mechanism 19, delimber unit 20) |
| 9SV | Saw Motors Ml |
| 10SV | Traverse Motors M2 |

Valves 1SV and 5SV are activated by a solenoid designated 1SV1 and 5SV1 respectively. When activated, valve 1SV connects the output of pump 301 to the high pressure side of system 300 to power same. When solenoid 1SV1 is de-energized, a spring 304 causes valve 1SV to connect the output of pump 301 back to the reservoir 302 of the system to prevent undue pressure buildup in the system 300.

The solenoid valve 5SV is connected to the high pressure side of system 300 through a hydro-pneumatic bag type accumulator 311 of known construction having its inlet connected to the high pressure side of system 300 through check valve CK1. Thus, the system 300 is constantly charging accumulator 311 and, when activated by energizing solenoid 5SV1, valve 5SV connects the outlet of accumulator 311 to cylinder 255 to rapidly retract its piston rod 258 and move the blade 250 to shear a tree trunk in the topper 21. When solenoid 5SV1 is de-energized, a spring 305 causes the valve 5SV to connect the cylinder 255 to the return side of system 300 so that the return spring 257 in cylinder 255 extends piston rod 258 to open the blade 250.

Each of the valves 2SV–4SV and 6SV–8SV have a first solenoid designated with the valve number with the numeral one, and a second solenoid designated with the valve number with the numeral 2. The first solenoid of each causes the piston rod of its associated cylinder to move in the indicated direction while the second solenoid of each causes the piston rod to move in the opposite direction.

Valve 9SV has a solenoid 9SV1 which connects the motor M1 to the high pressure side of system 300 when energized. This drives the saws 91 outwardly along edges 93 of tool bars 90. When solenoid 9SV1 is de-energized, the motor M1 is disconnected from the high pressure side of the system to stop same.

Valve 10SV is a reversing valve with its solenoid 10SV1 connecting motors M2 to the system 300 so that the rotation thereof moves the tree forwardly across the bed 12. The solenoid 10SV2 connects the motors M2 so that the tree is moved rearwardly across bed 12.

The cylinders 140 of the traversing mechanism 19 are operatively connected to a hydraulic accumulator 308 of known construction so that the frames 124 of the drive units 121 can move toward and away from the tree trunk while maintaining a substantially constant force urging the frame toward the tree trunk. Thus, when the solenoid 8SV2 is activated to retract the piston rods 144 and close the drive units 121 onto the tree trunk, the accumulator 308 will be charged. This allows the valve 8SV to return to its neutral position and the frames 124 moved under approximately constant pressure so that the sprocket units 130 can follow the contour of the tree trunk. A similar accumulator could be used to replace the spring compression unit for the delimber unit 20.

Referring to FIG. 19, the cylinders 170 of the outrigger means 17 are connected in parallel to the common outputs of the valve 3SV. The cylinders 170 are also individually connected to the outputs of a differential valving arrangement 309 of known construction. The arrangement 309 has a single control lever 310 that applies pressure to the cylinders 170 differentially in response to manual movement of lever 310 so that the operator may level the machine 10 even though it is on unlevel terrain to facilitate the cutting of trees.

CONTROL CIRCUIT

Figure 20:
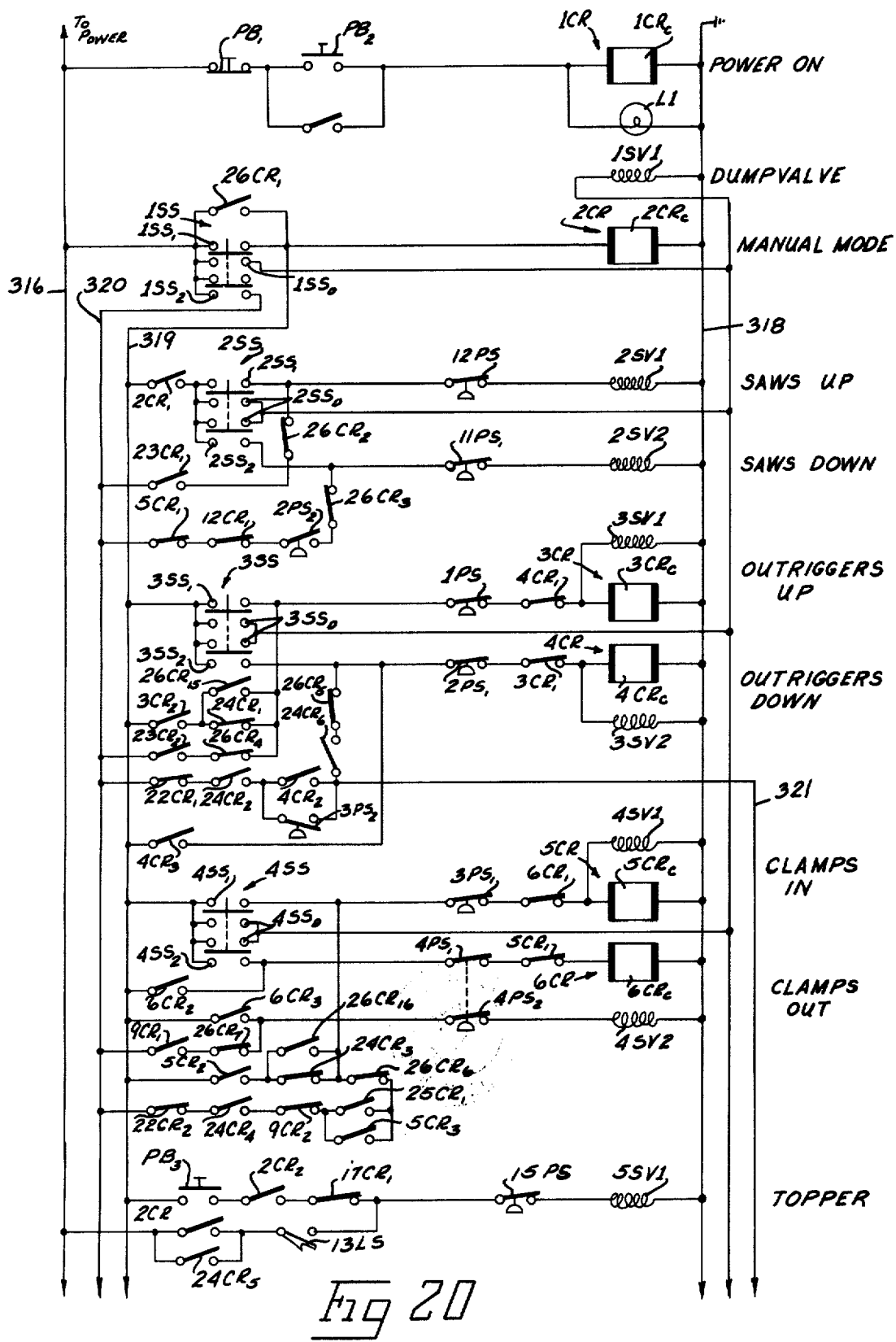
FIGS. 20–22 are a schematic control circuit for the machine.
Figure 21:
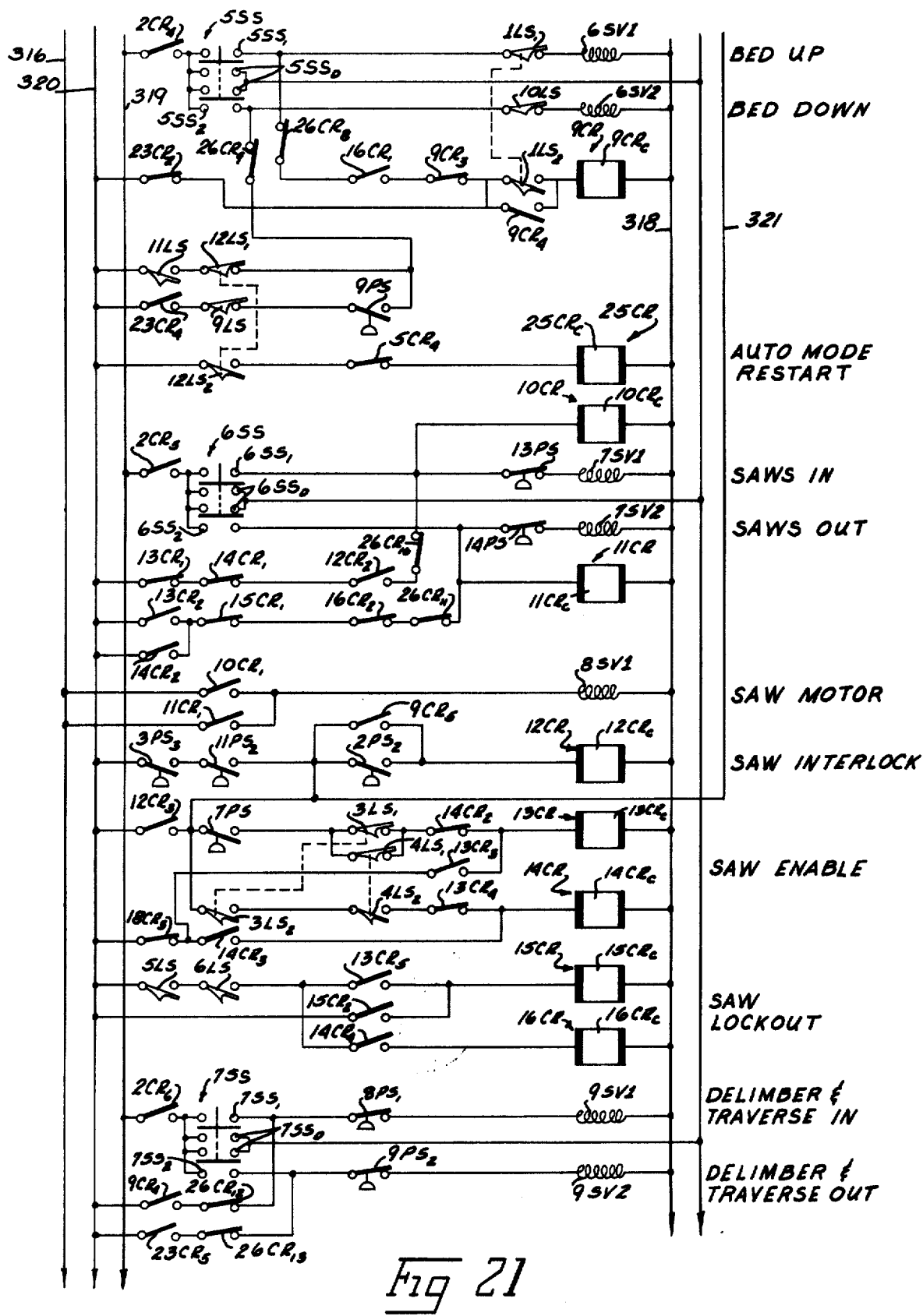
Figure 22:
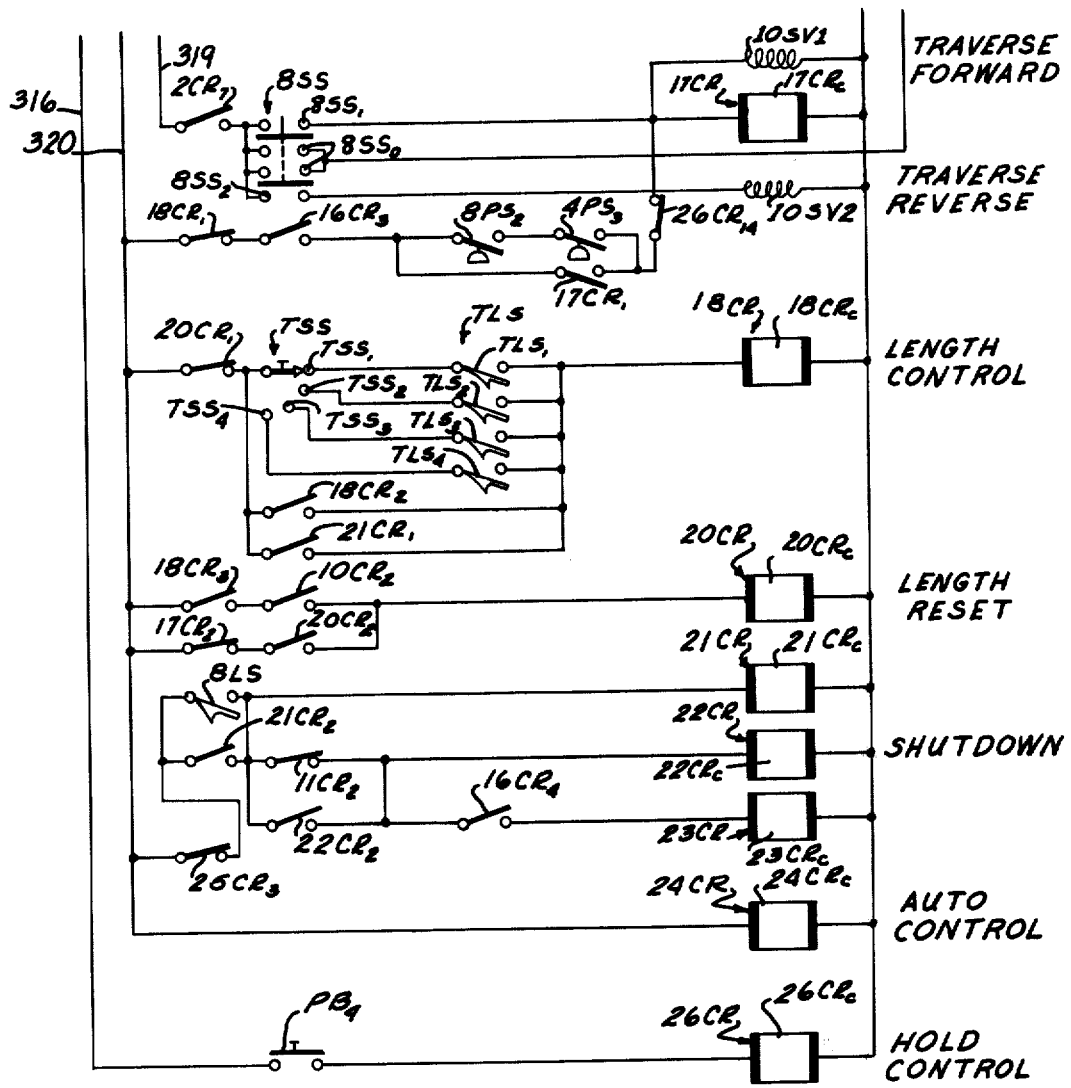

Referring to FIGS. 20–22, the control circuit 315 includes a primary common hot wire 316 and a common ground wire 318 connected to a 12 volt DC power source. A system selector switch 1SS selectively connects the primary common hot wire 316 to a common manual hot wire 319 or to a common automatic hot wire 320.

A normally closed system stop pushbutton switch $PB_1$ is connected between wires 316 and 318 in series with normally open system start pushbutton switch $PB_2$ and the coil $1CR_c$ of system control relay 1CR. Normally open contacts $1CR_1$ are in parallel across switch $PB_2$, and system ON light $L_1$ as well as solenoid $1SV_1$ of dump valve 1SV is connected in parallel across coil $1CR_c$. Normally open contacts $1CR_2$ are also interposed in hot wire 316 to disconnect the rest of the system from the power source until the relay 1CR is energized.

System mode selector switch 1SS has its manual contacts $1SS_1$ connected in series with coil $2CR_c$ of manual control relay 2CR between wires 316 and 318. Contacts $1SS_1$ also connect manual hot wire 319 with hot wire 316. The automatic contacts $1SS_2$ connect hot wire 316 with hot wire 320 of the automatic circuit. Thus, when contacts $1SS_1$ are closed, the system is ready for manual operation and when contacts $1SS_2$ are closed, the system is ready for automatic operation. Dump contacts $1SS_D$ connect the solenoid $1SV1$ to the hot wire 316 when contacts $1SS_2$ are closed so that hydraulic pressure is supplied to the system. The general function of each part of the circuit is listed on the schematic diagram for clarity.

When manual hot wire 319 is powered, the height selector switch 2SS can be manually operated to raise or lower the cutting assembly 16 with respect to the ground. The up contacts $2SS_1$ of switch 2SS connect the up solenoid 2SV1 of valve 2SV to hot wire 319 through normally open contacts $2CR_1$ of relay 2CR and normally closed pressure switch 12PS in the rod end line of fluid cylinders 66. The down contacts $2SS_2$ of switch 2SS connect down solenoid 2SV2 to hot wire 319 through contacts $2CR_1$ and normally closed pressure switch 11PS in the closed end line of cylinders 66. Contacts $2SS_D$ connect solenoid 1SV1 of dump valve 1SV to hot wire 319 through contacts $2CR_1$ when either up contacts $2SS_1$ or down contacts $2SS_2$ are closed.

When automatic hot wire 320 is powered, normally open contacts $23CR_1$ of shutdown relay 23CR connect up solenoid 2SV1 to wire 320 through pressure switch 12PS. Also, normally open contacts $5CR_1$ of clamp control relay 5CR in series with normally closed contacts $12CR_1$ of the saw interlock relay 12CR and normally open contacts $2PS_2$ of pressure switch 2PS connect the down solenoid 2SV2 to wire 320 through pressure switch 11PS.

Outrigger selector switch 3SS can be manually operated to selectively deploy the outriggers 160 or retract them when manual hot wire 319 is powered. The up or retracting contacts $3SS_1$ of switch 3SS connect the up solenoid 3SV1 of valve 3SV and coil $3CR_c$ of control relay 3CR in parallel to wire 319 through normally closed contacts $4CR_1$ of relay 4CR and normally closed pressure switch 1PS located in the rod end line of cylinders 170. The deploy or down contacts $3SS_2$ of switch 3SS connect the down solenoid 3SV2 of solenoid 3SV and coil $4CR_c$ of relay 4CR in parallel to wire 319 through normally closed contacts $3CR_1$ of relay 3CR and normally closed pressure switch 2PS in the closed end line of cylinders 170. Dump contacts $3SS_D$ connect solenoid 1SV1 to wire 319 when either contacts $3SS_1$, or $3SS_2$ are closed. Normally open holding contacts $3CR_2$ in series with normally closed contacts $24CR_1$ of automatic control relay 24CR, are connected across contacts $3SS_1$ to maintain coil $3CR_c$ and solenoid 3SV1 until switch 1PS opens. Likewise, normally open holding contacts $4CR_3$ are in parallel across contacts $3SS_2$ to maintain coil $4CR_c$ and solenoid 3SV2 until switch 2PS is opened.

In automatic operation, normally open contacts 23CR$_2$ connect coil 3CR$_c$ and solenoid 3SV1 to automatic hot wire 320 through contacts 4CR$_1$ and switch 1PS. Coil 4CR$_c$ and solenoid 3SV2, on the other hand, are connected to wire 320, in addition to contacts 3CR$_1$ and switch 2PS, through normally closed contacts 22CR$_1$ of sequence control relay 22CR, normally open contacts 24CR$_2$ of relay 24CR, normally open contacts 3PS$_2$ of pressure switch 3PS located in the closed end line of clamping cylinders 119 and the normally open isolation contact 24CR$_6$ of relay 24CR. Holding contacts 4CR$_2$ which are normally open and in parallel with contacts 3PS$_2$ maintain coil 4CR$_c$ and solenoid 3SV$_2$ when the clamping arms 111 move out.

Selector switch 4SS controls the manual operation clamping mechanism 15 to selectively hold the tree trunk on bed 14. The in contacts 4SS$_1$ of switch 4SS connect coil 5CR$_c$ of relay 5CR and in solenoid 4SV1 of valve 4SV in parallel to manual hot wire 319 through normally closed contacts 6CR$_1$ of relay 6CR and normally closed contacts 3PS$_1$ of pressure switch 3PS. The out contacts 4SS$_2$ of switch 4SS connect the coil 6CR$_c$ of relay 6CR to manual hot wire 319 through normally closed contacts 5CR$_1$ of relay 5CR and normally closed contacts 4PS$_1$ of pressure switch 4PS located in the rod end line of cylinders 119. Dump contacts 4SS$_D$ connect solenoid 1SV1 to wire 319 when either contacts 4SS$_1$ or 4SS$_2$ are closed. The out solenoid 4SV2 of valve 4SV is connected to wire 319 through normally closed contacts 4PS$_2$ of switch 4PS and normally open contacts 6CR$_3$ of relay 6CR. Holding contacts 6CR$_2$ of relay 6CR are connected in parallel across contacts 4SS$_2$ to maintain coil 6CR$_c$ until contacts 4PS$_1$ are opened. Normally closed contacts 24CR$_3$ of relay 24CR in series with normally open contacts 5CR$_2$ across contacts 4SS$_1$ maintain coil 5CR$_c$ and solenoid 4SV1 until contacts 3PS$_1$ of pressure switch 3PS are opened.

In the automatic operational mode, coil 5CR$_c$ and in solenoid 4SV1 are connected to hot wire 320 through normally closed contacts 22CR$_2$, normally open contacts 24CR$_4$, normally closed contacts 9CR$_2$ of bed control relay 9CR, and normally open contacts 25CR$_1$ in addition to the contacts 3PS$_1$ and 6CR$_1$. The normally open contacts 9CR$_1$ of relay 9CR connect down solenoid 4SV2 to wire 320 through contacts 4PS$_2$.

Pushbutton switch PB$_3$ controls the manual operation of the topper 21. Switch PB$_3$ connects the topper solenoid 5SV1 of valve 5SV to manual hot wire 319 through normally closed contacts 17CR$_1$ of traverse control relay 17CR and normally open contacts 2CR$_2$ of relay 2CR. For automatic operation, the solenoid 5SV1 is connected to the primary hot wire 316 through normally open topper limit switch 13LS in series with normally open contacts 2CR$_3$ and normally open contacts 24CR$_5$ in parallel with each other. The limit switch 13LS is carried by the upper drive unit 121 of the traversing mechanism 19 and is closed when the diameter of the tree reaches the minimum useful size, the size illustrated being 3 inches. Thus, the topper 21 will operaate automatically whether the main system is in its manual or automatic mode upon closure of switch 13LS.

The bed selector switch 5SS selectively tilts the bed 14 down to a vertical position for felling trees or up to a horizontal position for processing the felled tree. Normally open contacts 2CR$_4$ of manual relay 2CR connect one side of switch 5SS to manual hot wire 319. The up contacts 5SS$_1$ of switch 5SS connect the up solenoid 6SV1 of valve 6SV to hot wire 319 through the normally closed contacts 1LS$_1$ of the up limit switch 1LS and the contacts 2CR$_4$. The down contacts 5SS$_2$ of switch 5SS connect the down solenoid 6SV2 to hot wire 319 through normally closed maximum down limit switch 10LS and the contacts 2CR$_4$. The dump contacts 5SS$_D$ connect the dump solenoid 1SV1 to wire 319 when either contacts 5SS$_1$ or 5SS$_2$ are closed. The up lockout relay 9CR has its coil 9CR$_c$ connected to hot wire 319 through normally open contacts 1LS$_2$, normally closed contacts 9CR$_3$ or relay 9CR and normally open contacts 16CR$_1$ of saw lockout relay 16CR by the contacts 5SS$_1$ and contacts 2CR$_4$. Normally open contacts 9CR$_4$ are in parallel across contacts 1LS$_2$ to maintain coil 9CR$_c$.

In automatic operation the coil 9CR$_c$ is connected to the hot wire 320 through the contacts 1LS$_2$ and normally closed shutdown contacts 23CR$_3$. The holding contacts 9CR$_4$ are also connected in parallel across contacts 1LS$_2$ in this arrangement. The up solenoid 6SV1 is connected to wire 320 through contacts 1LS$_1$, contacts 16CR$_1$, 9CR$_3$ and 23CR$_3$. The down solenoid 6SV2 is connected to wire 320 through limit switch 10LS, the normally closed contacts 12LS$_1$ of the upper bed alignment limit switch 12LS, and the normally open lower bed alignment limit switch 11LS. The normally closed maximum auto limit switch 9LS, normally open contacts 9PS$_1$ of pressure switch 9PS located in the closed end line of traversing cylinders 140 and the normally open contacts 23CR$_4$ of shutdown relay 23CR are in parallel across limit switch 11LS and the contacts 12LS$_1$ of switch 12LS.

The normally open contacts 12LS$_2$ of limit switch 12LS connect the coil 25CR$_c$ of the automatic mode restart relay 25CR to wire 320 through normally closed contacts 5CR$_4$ of relay 5CR. The relay 25CR restarts the automatic felling and processing cycle when the bed 14 becomes aligned with the tree trunk.

The selector switch 6SS controls the position of the tool bars 90 carrying saws 91 in the cutting assembly 16 when the manual hot wire 319 is powered. All of the inputs to the contacts of switch 6SS are connected to hot wire 319 through the manual power contacts 2CR$_5$ to power same in manual mode. The in contacts 6SS$_1$ of switch 6SS connect the in solenoid 7SV1 of valve 7SV and coil 10CR$_c$ of relay 10CR in parallel to wire 319 through the normally closed pressure switch 13PS in the closed end line of cylinders 95 and contacts 2CR$_5$. The out contacts 6SS$_2$ of switch 6SS connect the out solenoid 7SV2 of the valve 7SV and coil 11CR$_c$ of relay 11CR in parallel to wire 319 through normally closed pressure switch 14PS located in the rod end line of cylinders 95 and the contacts 2CR$_5$. The dump contacts 6SS$_D$ connect wire 319 to the dump valve solenoid 1SV1 through contacts 2CR$_5$ when either contacts 6SS$_1$ or 6SS$_2$ are closed to power the system.

In the automatic mode, the auto hot wire 320 is connected to coil 10CR$_c$ and solenoid 7SV1 in parallel through the switch 13PS, normally open interlock contacts 12CR$_2$ of relay 12CR, normally closed contacts 14CR$_1$ of the normal out enabling relay 14CR, and normally closed contacts 13CR$_1$ of the emergency out enabling relay 13CR. The coil 11CR$_c$ and 7SV2 are connected to wire 320 through switch 14PS, normally closed contacts 16CR$_2$ of the normal saws out control relay 16CR, normally closed contacts 15CR₁ of the emergency saws out control relay 15CR, and the normally open contacts 13CR₂ of relay 13CR. Normally open contacts 14CR₂ are connected in parallel across contacts 13CR₂.

The operating solenoid 8SV1 of valve 8SV is connected to the primary hot wire 316 through normally open contacts 10CR₁ of relay 10CR and normally open contacts 11CR₁ of relay 11CR in parallel. Thus, saws 91 will be operated while they are moved in or out either manually or on automatic mode.

The saw interlock relay 12CR has its coil 12CR_c connected to wire 320 through the normally open contacts 2PS₂ of switch 2PS, normally open contacts 11PS₂ of pressure switch 11PS, and normally open contacts 3PS₃ of switch 3PS. Normally open contacts 9CR₅ of relay 9CR are in parallel across contacts 2PS₂ and normally open holding contacts 12CR₃ of relay 12CR are connected in parallel across contacts 3PS₃. The coil 12CR_c is also connected to wire 320 through the contacts 9CR₅ and 2PS₂ in parallel, wire 321, contacts 4CR₂ and 3PS₂ in parallel, contacts 24CR₂ and contacts 22CR₁.

Relay 13CR controls the emergency out enabling function of the saws and is responsive to the pressure switch 7PS located in the closed end line of the cylinders 95. Coil 13CR_c is connected to auto hot wire 320 through normally closed contacts 14CR₂ of relay 14CR, normally closed contacts 3LS₁ of limit switch 3LS and contacts 4LS₁ of limit switch 4LS in parallel, normally open pressure switch 7PS, and normally open contacts 12CR₃ and 3PS₃ in parallel. Normally open holding contacts 13CR₃ also connect coil 13CR₃ to wire 320 through normally closed contacts 18CR₁ of the measurement control relay 18CR.

The relays 15CR and 16CR serve as lockouts to hold the saws in a disabled condition until de-energized. The coil 15CR_c of relay 15CR is connected to wire 320 through normally open contacts 13CR₅, normally open limit switch 6LS and normally open limit switch 5LS. Normally open holding contacts 15CR₂ also connect coil 15CR_c to wire 320. Coil 16CR_c of relay 16CR is connected to wire 320 through normally open contacts 14CR₄ and the switches 5LS and 6LS.

The selector switch 7SS controls the manual operation of the delimber unit 20 as well as the position of the frames 124 of the traversing mechanism 19. The normally open manual control contacts 2CR₆ connect one side of switch 7SS to manual hot wire 319. Contacts 7SS₁ of switch 7SS connect the in solenoid 9SV1 of valve 9SV to hot wire 319 through the normally closed contacts 8PS₁ in the pressure switch 8PS located in the rod end line of cylinders 140 and the contacts 2CR₆. The contacts 7SS₂ connect the out solenoid 9SV2 of valve 9SV to wire 319 through normally closed contacts 9PS₂ of pressure switch 9PS and the contacts 2CR₆. Dump contacts 7SS_D connect dump solenoid 1SV1 to wire 319 when either contacts 7SS₁ or 7SS₂ are closed.

In the automatic mode, the solenoid 9SV1 and contacts 8PS₁ are connected to wire 320 through normally open contacts 9CR₄ of relay 9CR. The solenoid 9SV2 and contacts 9PS₂ are connected to wire 320 through normally open shut-down contacts 23CR₅ of relay 23CR.

The traversing drive motors M2 are manually controlled by the selector switch 8SS. The input side of switch 8SS is connected to hot wire 319 through normally open manual contacts 2CR₇. The forward solenoid 10Sv1 of valve 10SV and coil 17CR_c of the relay 17CR in parallel are connected to wire 319 through forward contacts 8SS₁ and the contacts 2CR₇. The reverse solenoid 10SV2 of valve 10SV is connected to wire 319 through the reverse contacts 8SS₂ of switch 8SS and contacts 2CR₇. The dump contacts 8SS_D connect the dump solenoid 1SV1 to wire 319 when contacts 8SS₁ or 8SS₂ are closed.

In automatic operation, the coil 17CR_c and solenoid 10SV1 are connected to wire 320 through the normally open contacts 4PS₃ of pressure switch 4PS, normally open contacts 8PS₂ of pressure switch 8PS, normally open contacts 16CR₃ of relay 16CR, and normally closed contacts 18CR₁ of the length control relay 18CR. Normally open holding contacts 17CR₁ of relay 17CR are connected across contacts 8PS₂ and 4PS₃ in parallel therewith to maintain coil 17CR_c and solenoid 10SV1 after contacts 8PS₂ or 4PS₃ open.

The tree may be cut into predetermined lengths automatically when the system is in automatic mode and uses a traversing length switch TLS for this operation. The switch TLS has multiple contacts TLS₁–TLS₄ which are coupled to a peripherally toothed sprocket 330 which is rotatably mounted on the frame 124 of the upper drive unit 121 of the traversing mechanism. The support shaft 331 mounting the sprocket 330 positions same in the gap 136 between the sprockets 134 so that the teeth 332 on sprocket 330 engage the tree when the teeth 135 of the drive sprockets 134 engage the tree trunk. Thus, when sprockets 134 drive the tree across bed 14, the sprocket 330 of switch TLS will be rotated. The sprocket 330 is coupled to the contacts TLS₁–TLS₄ so that they are individually closed in known manner after a selected number of revolutions of sprocket 330. Thus, contacts TLS₁ will be closed when sprocket 330 has rotated a prescribed number of revolutions corresponding to movement of the tree trunk with respect to the bed for a first prescribed distance, contacts TLS₂ will be closed when the tree trunk has moved a second prescribed distance, et. seq. in known manner. A length selector switch TSS is provided for selectively enabling one set of contacts TLS₁–TLS₄ that is manually operated to close one of its contacts TSS₁–TSS₄. The switch TLS is automatically reset in known manner after coil 18CR_c is energized.

The length control relay 18CR has its coil connected to hot wire 320 through the switches TLS and TSS, and normally closed contacts 20CR₁ of restart relay 20CR. Normally open holding contacts 18CR₂ of relay 18CR are connected in parallel across switches TSS and TLS to maintain coil 18CR_c until contacts 20CR₁ open. Normally open contacts 21CR₁ of relay 21CR are also connected in parallel across switches TSS and TLS to energize coil 18CR_c.

The restart relay 20CR serves to disable the measuring circuit until the tree trunk is again traversed after each length cutting operation. Coil 20CR_c of relay 20CR is connected to wire 320 through normally open contacts 10CR₂ of relay 18CR. Normally closed contacts 17CR₂ of relay 17CR and normally open holding contacts 20CR₂ of relay 20CR in series are connected in parallel across contacts 10CR₃ and 18CR₃ to maintain coil 20CR_c.

The shut down operation is controlled through normally open switch 8LS carried by the upper drive unit 121 of the traversing mechanism 19. Switch 8LS is closed after the upper end of the tree has passed the unit 121 which is after the switch 13LS has closed. The coil 21CR$_c$ of relay 21CR is connected to wire 320 through switch 8LS and normally closed contacts 25CR$_2$ of the automatic mode restart relay 25CR. Normally open holding contacts 21CR$_2$ are connected in parallel across switch 8LS. The coil 22CR$_c$ of the relay 22CR is connected to wire 320 through normally open contacts 11CR$_2$ of relay 11CR in series with the switch 8LS and contacts 21CR$_2$ in parallel and the contacts 25CR$_2$. Normally open holding contacts 22CR$_2$ of relay 22CR are connected in parallel across contacts 11CR$_2$. The coil 23CR$_c$ of shutdown relay 23CR is connected to wire 320 through normally open contacts 16CR$_4$ of relay 16CR in series with the parallel circuit of contacts 11CR$_2$ and 22CR$_2$, with the parallel circuit of contacts 21CR$_2$ and switch 8LS, and with contacts 25CR$_2$.

Because it is necessary to sometimes stop the automatic operation of the machine 10 while the prime mover 11 is moved or if a problem is encountered during the felling and/or processing of a tree, a holding circuit 350 is provided which allows the automatic operation to be selectively interrupted and again restarted without the automatic control losing its sequence of operation. The holding circuit 350 includes a momentary normally open pushbutton switch PB$_4$ in series with relay coil 26CR$_c$ of holding relay 26CR between primary hot wire 316 and ground wire 318. Coil 26CR$_c$ operates normally open contacts 26CR$_1$, 26CR$_{15}$ and 26CR$_{16}$ and normally closed contacts 26CR$_2$–26CR$_{14}$ when energized. Contacts 26CR$_1$ are connected in parallel across contacts 1SS$_1$ to energize the manual mode relay 2CR when closed and power manual hot wire 320. Contacts 26CR$_2$ disconnect the automatic controls from the saws up solenoid 2SV1 when opened and contacts 26CR$_3$ disconnect the automatic controls from the saws down solenoid 2SV2 when opened.

Contacts 26CR$_4$ disconnect the automatic controls from the outriggers up solenoid 3SV1 when opened while contacts 26CR$_{15}$ are in parallel across contacts 24CR$_1$ to short out contacts 24CR$_1$ when closed to allow the manual operation to take place. Contacts 26CR$_5$ disconnect the automatic controls from the outriggers down solenoid 3SV2 when opened.

Contacts 26CR$_6$ disconnect the clamps in solenoid 4SV1 from the automatic controls when opened while contacts 26CR$_{16}$ are connected in parallel across contacts 24CR$_3$ to short them out when closed and allow the manual operation to take place. The contacts 26CR$_7$ disconnect the clamps out solenoid 4SV2 from the automatic controls when opened. Contacts 26CR$_8$ disconnect the bed up solenoid 6SV1 from the automatic controls when opened while contacts 26CR$_9$ disconnect the bed down solenoid 6SV2 from the automatic controls when opened.

Contacts 26CR$_{10}$ disconnect the saws in solenoid 7SV1 and coil 10CR$_c$ from the automatic controls when opened to allow manual operation of the tool bars 90 and saws 91. The contacts 26CR$_{11}$, on the other hand, disconnect the saws out solenoid 7SV2 and coil 11CR$_c$ from the automatic controls when opened to allow manual operation of the tool bars 90 and saws 91.

Contacts 26CR$_{12}$ disconnect the delimber and traverse in solenoid 9SV1 from the automatic controls when opened while contacts 26CR$_{13}$ disconnect the delimber and traverse out solenoid 9SV2 from the automatic controls when opened. Likewise, contacts 26CR$_{14}$ disconnect the traverse forward solenoid 10SV1 from the automatic controls when opened.

It will thus be seen that when the operator manually closes the holding switch PB$_4$, he disconnects all of the solenoids from the automatic controls and reconnects them through the manual controls. This, however, leaves the automatic controls powered so that, when the switch PB$_4$ is released, automatic operation will again be resumed without loss of sequence. When switch PB$_4$ is closed, the system may be manually operated to clear any problem and then the operation resumed when the switch PB$_4$ is again closed.

The sprocket 330 is left connected to the traversing length switch TLS when the holding circuit 350 is energized. This insures correct operation of the measuring circuit since the sprocket 330 will drive the switch TLS forward or in reverse as the traversing mechanism 19 drives the tree back and forth under manual control as is necessary to clear a traversing stoppage.

SHEAR CUTTING ASSEMBLY

Referring to FIGS. 23 and 24, an alternate embodiment of the cutting assembly is shown and designated 516. The cutting assembly 516 is mounted on the lower end of bed 14 in replacement of the assembly 16. The assembly 516 has a positioning means 518 similar to the means 65 and a carriage 519 similar to carriage 60. The fluid cylinders 520 of positioning means 518 position carriage 519 with respect to the ground and the lower end of bed 14.

A housing 521 is mounted on the underside of carriage 519 with a top wall 522, back wall 524 and bottom wall 525 with a forwardly facing open mouth 528 lying generally in the plane of the forward surface of bed 14.

A pair of shear units 530 are pivoted at a central location within the housing 521. The units 530 can be pivoted forwardly out of housing 521 to shear a tree as they come together. Each unit 530 includes a support arm 531 which mounts a semi-circular shear blade 532. The arm 531 is pivoted at its inner end on a pivot pin 534 carried by housing 521. The pivot pin 534 is so located that when the arms 531 are both pivoted full in toward each other, the straight cutting edges 535 of the blades 532 are parallel and meet forwardly of and laterally aligned with the centerline CL-B of bed 14. Also the blades 532 move in a plane generally perpendicular to the centerline CL-B.

A fluid cylinder 540 is provided for positioning each shear unit 530. Each cylinder 540 is pinned in a bracket 536 at the outwardly extending ends of housing 521 and its piston rod 541 is pinned to the arm 531 so that the line of force F as seen in FIG. 23 passes through blade 532 in such a way as to minimixe the reactive force on the support pin 534. This results in less wear on the arms 531 and better cutting characteristics of the units 530.

A switch acutator lug 545 is provided on each arm 531 similar to lugs 100 on the cutting assembly 16. The lugs 545 engage the limit switches 3LS-6LS to control the position of arms 531 similarly to tool bars 90 of the assembly 16.

OPERATION

In operation, the prime mover 11 is moved toward a tree with the bed 14 in its vertical position as seen in FIG. 1. The clamps 111 of the clamping mechanism 15 are in their out or open position, the drive units 121 of the traversing mechanism 19 are also in their out or open position, and the tool bars 90 in chain saws 91 are in their open or out position. Also, it will be noted that the movable delimbing blades 201 of the delimber unit 20 in the topper 21 are in their open position. The driver, using the controls that are provided in the prime mover 11 causes the prime mover to approach the tree so that the tree is aligned with the centerline CL-B of the bed 14. It will also be noted that the outriggers 160 are in their up or retracted position at this point. As the operator approaches the tree, he energizes the control circuit 315 by depressing the start pushbutton switch $PB_1$ to energize relay 1CR and close contacts $1CR_1$ and $1CR_2$ to supply power across the primary hot wire 316 and the primary ground wire 318. The operator also manipulates the system mode selector switch 1SS to either its manual or automatic position. The manual mode will be described first, it being assumed that the operator will close the manual contacts $1SS_1$ to connect manual hot wire 319 with primary hot wire 316 to energize relay 2CR and close the normally open contacts thereof.

As the operator continues to approach the tree, he manipulates the bed selector switch 5SS to move the bed either up or down until it is aligned with the trunk of the tree. The operator manipulates the controls in the prime mover 11 until the bed 14 contacts the tree and applies pressure thereto. The operator then manipulates the clamp selector switch 4SS by closing the in contacts $4SS_1$ to connect the in solenoid 4SV1 to the hot wire 319. This transfers valve 4SV so that fluid is supplied to the closed end line of the cylinders 119 to cause the piston rods 118 thereof to extend and pivot the clamps 111 in to engage the tree and clamp it against the skid plate 54 on bed 14. The clamps 111 move in until the contacts 3PS are opened in response to pressure switch 3PS being operated by the hydraulic back pressure in the closed end line to cylinders 119 since holding contacts $5CR_2$ are closed when relay 5CR is energized in parallel with solenoid 4SV1. The operator then manipulates the outrigger selector switch 3SS to close the down contacts $3SS_2$ and energize the down solenoid $3SV_2$ and relay 4CR. This transfers valve 3SV to supply fluid to the closed end line of fluid cylinders 170 in each outrigger 160 to cause the piston rods 171 thereof to extend and deploy the outriggers. Holding contacts $4CR_3$ close when relay 4CR is energized to hold the solenoid $3SV_2$ until the pressure switch 2PS in the closed end line of cylinders 170 is opened. As the outriggers 160 are deployed, the ground engaging plates 174 thereof move outwardly and downwardly along path $P_3$ so as to enlarge the effective supporting area of the prime mover 11 while at the same time exerting an upward force on the prime mover 11 and bed 14 so that the clamps 111 now exert an upward pressure on the tree trunk. If the prime mover 11 is not level at this point, the operator may manipulate the lever 310 of the differential valving arrangement 309 to level the prime mover 11.

The operator then manipulates the saw height selector switch 2SS to close down contacts $2SS_2$ and energize down solenoid 2SV1. This transfers valve 2SV to supply fluid under pressure to the closed end lines of cylinders 66 to extend their piston rods 69 and move the cutting assembly 16 toward the ground adjacent the tree. When the bottom of housing 71 engages the ground, it causes a pressure buildup in the closed end fluid line to open switch 11PS and de-energize valve 2SV. This insures the maximum useful tree length and the minimum stump height as will be apparent.

The operator then manipulates the saw selector switch 6SS to close the in contacts $6SS_1$ thereof and energize the in solenoid 7SV1 and the relay 10CR since the contacts $2CR_5$ are already closed. This also energizes the saw motor solenoid 8SV1 by the closing of contacts $10CR_1$. This supplies fluid to the motor M1 causing the chain saws 91 to be moved about the tool bars 90. Also, valve 7SV is transferred to supply fluid to the closed end line of cylinders 95 which in turn causes the piston rods 98 to extend to pivot the tool bars 90 outwardly so that the chain saws 91 engage the tree. If the saws 91 bind as a result of the tool bars 90 being moved into the tree too fast, the pressure switch 13PS will be opened to stop the inward movement of the tool bars 90 until the saw moter M1 causes the chain saws to cut away the material causing the bind. Thus, the movement of the saw bars 90 may be started and stopped several times before the saws 91 are fully extended so that the teeth 94 thereof overlap as shown in FIG. 3. The operator then closes the out contacts $6SS_2$ to energize the out solenoid 7SV and relay 11CR. Relay 11CR causes the saw motors to continue to operate by the closing of contacts $11CR_1$ in parallel with contacts $10CR_1$. This also causes the valve 7SV to be transferred so that hudraulic pressure is imposed on the rod end line of cylinders 95 to cause the piston rods 98 to be retracted and the tool bars 90 to be withdrawn out of the tree. When the tool bars 90 are fully retracted the tree is now ready to be shifted and processed.

The operator then manipulates the bed selector switch 5SS to close contacts $5SS_1$ and energize the up solenoid 6SV1 since contacts $2CR_4$ are already closed. This transfers valve 6SV to supply fluid under pressure to the rod end line of the bed cylinders 56 and the piston rods 58 are retracted. This tips the bed 14 upwardly to a horizontal position while at the same time pivoting the tree about the axis $A_1$ so that its trunk is moved forwardly of the machine while the top is moved rearwardly thereof. It will be noted that the length-to-height ratio of the machine is approximately 1:1 and that the bed 14 is tilted up to its horizontal position with the tree thereon, the weight of the bed and the base of the tree trunk as the tree is pivoted, causes the center of mass to remain approximately the same after the tree has been pivoted to a horizontal position as it was before the tree was cut. This makes for a very stable vehicle both during the felling of the tree and the processing thereof. As the tree is pivoted about the axis $A_1$, it will be seen that the trunk passes within the opening 209 between the movable blades 201 of the delimber unit 20 so that the tree trunk rests on top of the stationary blade 202 of the delimber unit 20. Because the limbs on a tree, especially a pine tree, do not start for a significant distance up the tree trunk, predominantly all of the limbs on the tree will extend from that portion of the trunk rearwardly of the delimber unit 20. When the bed 14 has been tilted up to its horizontal position, the contacts $1LS_1$ of the limit switch 1LS will be closed to de-energize solenoid 6SV1 and stop the upward tilting of the bed 14.

The operator then manipulates the selector switch 7SS to close the in contact $7SS_1$ to energize solenoid 9SV1 since the contacts 2CR$_6$ are already closed. This transfers the valve 9SV so that the fluid under pressure is supplied to the rod end lines of the cylinders 140 so as to retract the piston rods 144 and pivot the drive units 121 in over the tree until the sprocket units 130 thereof engage the tree trunk. The transfer of valve 9SV also is effective to supply fluid under pressure to the closed end line of cylinders 244 of the delimber unit 20 so as to extend the piston rods 242 thereof to cause the movable delimber blades 201 to be moved inwardly toward each other until the tree trunk is engaged. It will be noted that when the piston rods 144 of the cylinders 140 are being retracted, the accumulator 308 attached to the cylinders 140 is charged. When the delimber blades 201 and drive units 121 are both to their in position, a pressure buildup in the appropriate hydraulic lines opens the contacts 8PS$_1$ of the pressure switch 8PS to de-energize the in solenoid 9SV1. It will now be noted that the rod end lines of cylinders 140 are connected to the accumulators 308 so that relative movement of the units 121 toward and away from the tree trunk as the tree trunk passes thereby is possible while the same pressure is maintained on the units forcing the units toward the tree trunk.

• After the delimber unit 20 and the traversing mechanism 19 are in, the operator then manipulates the clamp selector switch 4SS so as to close the out contacts 4SS$_1$ to energize relay 6CR and the out solenoid 4SV2. This transfers the valve 4SV to supply fluid to the rod end lines of cylinders 119 to retract the piston rods 118 thereof and move the clamps 111 outwardly away from the tree to release same. When the clamps 111 are fully open, the pressure switch 4PS is activated to open contacts 4PS$_1$ and 4PS$_2$ to de-energize the solenoid 4SV2 and relay 6CR. At this time, the tree trunk is supported on the fixed blade 202 of the delimber unit 20, the roller 246 just forwardly of the delimber unit 20, the sprockets 149 of idler unit 122 on top of bed 14, and the knife edge rollers 51 on the lower portion of bed 14. The knife edges 52 of rollers 51 serve to maintain the tree alignment as the tree is being processed.

The operator then manipulates the traversing selector switch 8SS to close the forward contacts 8SS$_1$ thereof and energize the forward solenoid 10SV1 since contacts 2CR$_7$ are already closed. This supplies fluid under pressure to the forward inlet side of motors M2 to rotate the sprocket units 130 and translate the tree forwardly butt end first across the bed 14 and through the delimber unit 20. As the tree trunk is being transversed forwardly, the cutting edges 220 of the delimber unit 20 engage limbs on the tree as it passes thereby and shears them from the tree trunk to provide a smooth trunk ready for processing. The coil spring 238 in the compression tubes 232 causes the blades to be resiliently urged toward the tree trunk at all times yet allow the blades 201 to move toward and away from the tree trunk to compensate for irregularities in the trunk itself. Those limbs that are not sheared from the trunk by the main delimber blades 201 and 202 of the delimber unit 20 are sheared from the trunk by the subassemblies 270 on the traversing mechanism 19. This produces a clean processable tree trunk. After the operator has traversed the tree trunk forwardly a prescribed amount, he may manipulate the switch 8SS to stop the traversing of the tree trunk and manipulate the saw switch 6SS to cut the tree trunk into selected lengths. After the tree trunk has been cut with the saws 91, the operator may restart the motors M2 through switch 8SS to continue the traversing and delimbing of the tree trunk.

When the tree trunk reaches a predetermined minimum size at the upper drive unit 121 of the traversing mechanism 19, the switch 13LS is closed to energize the topper solenoid 5SV1 since contacts 2CR$_3$ are already closed to cause the fluid under pressure to be supplied to the rod end line of the cylinder 255 to retract the piston rod 258 thereof and draw the topper blade 250 down across the tree trunk so that its cutting edge 252 shears the same. As the blade tip hits the arrestor 259, the pressure buildup causes the pressure switch 15PS in the cylinder hydraulic line to open so that solenoid 5SV1 will be de-energized and the blade 250 will be opened. Because the speed with which blade 250 is closed is so fast, the traversing of the tree trunk does not have to be stopped while the tree is topped. Also, if a section of the tree is reached which cannot be further processed, such as a fork in the tree, the topper may be manually operated by the pushbutton switch PB$_3$ to energize solenoid 5SV1 to shear the tree.

When the traversing of the tree is finished, the operator then manipulates the bed tilt switch 5SS to close contacts 5SS$_2$ and drive the bed 14 down because solenoid 6SV2 is energized. When the bed 14 reaches the maximum amnual down Position B, the limit switch 10LS is opened to deenergize the solenoid 6SV2 to stop the downward movement of the bed 14. At the same time, the operator manipulates the traversing drive switch 8SS, the delimber switch 7SS, and the outrigger switch 3SS to move the delimbers out along with the drive units 121 of the traversing mechanism 19, to stop the rotation of motors M2, and to raise the outriggers 160. As soon as the outriggers 160 leave the ground, the operator can start the prime mover 11 moving forwardly to the next tree.

If the operator elects to have the system in its automatic mode, he manipulates the mode selector switch 1SS to close contacts 1SS$_2$ and power the auto hot wire 320. Before he does this, however, he must insure that the bed 14 is pivoted up at least to Position A seen in FIG. 2. When the system is in automatic mode, the operator simply drives the prime mover 11 toward the tree to be felled and processed and aligns the tree trunk with the centerline CL-B of the bed 14. Because the bed is in Position A, as seen in FIG. 2 lower alignment switch 11LS which energizes the down solenoid 6SV2 to transfer valve 6SV and supply fluid to the closed end line of the cylinders 56. This causes the bed 14 to be pivoted downwardly until the tree trunk moves into alignment with the bed 14. When the tree trunk becomes aligned with the bed 14, the upper alignment switch 12LS is made so that contacts 12LS$_1$ are open to deenergize solenoid 6SV2 with the bed aligned with the tree trunk. When switch 12LS is made, its contacts 12LS$_2$ are closed to energize relay 25CR. This closes the contacts 25CR$_1$ in the clamp circuit to energize the in solenoid 4SV1 because the normally open contacts 24CR$_4$ have already been closed by the energizing of the automatic control relay 24CR as power is supplied to hot wire 320. Closing contacts 25CR$_1$ also energize relay 5CR which opens the contacts 5CR$_4$ to de-energize the automatic mode restart relay 25CR while at the same time closing the holding contacts 5CR$_3$ across contacts 25CR₁ to maintain the solenoid. When the clamps 111 have moved in fully and engaged the tree trunk, this causes the contacts 3PS₁ of pressure switch 3PS to open.

When the pressure switch 3PS is activated, the contacts 3PS₂ in the outrigger circuit are closed to energize the down solenoid 3SV2 and relay 4CR. This supplies fluid to the closed end line of the outrigger cylinders 170 to extend their piston rods 171 and deploy the ground engaging plates 174 outwardly and downwardly along path P3 until the plates engage the ground.

When pressure switch 3PS is activated to de-energize relay 5CR, the contacts 5CR₁ are again closed and when pressure switch 2PS is activated by the back pressure from cylinders 170, the contacts 2PS₂ are closed to energize solenoid 2SV2 in the saws down circuit. This supplies fluid under pressure to the closed end line of cylinders 66 to extend the piston rods 68 thereof and drive housing 71 down against the ground. When the housing 71 strikes the ground adjacent the tree trunk, the back pressure in the closed end line causes the pressure switch 11PS to open to de-energize the solenoid 2SV2. This serves to place the chain saws 91 as close as possible to the ground so that the tree trunk is sheared substantially flush with ground level and produce the maximum amount of usefull wood from the tree trunk.

When the pressure switch 11PS is engaged, the normally open contacts 11PS₂ in the saw interlock circuit are closed to energize relay 12CR since the contacts 3PS₃ and 2PS₂ have already been closed when the clamps 111 have moved in against the tree trunk. This closes the contacts 12CR₂ in the saws in circuit to energize the in solenoid 7SV1 and relay 10CR. Energizing relay 10CR closes contacts 10CR₁ to energize the saw motor solenoid 8SV1. Thus, the saws 91 are moved about the tool bars 90 and the tool bars 90 are pivoted in toward each other because fluid under pressure is supplied to the closed end line of the saw bar cylinders 95 to extend their piston rods 98. The pressure switch 13PS will be open if the back pressure from the cylinders 95 exceeds the predetermined pressure at which switch 13PS is set. When the saws 91 are fully in so that the teeth 94 on opposite saws 91 overlap, the limit switches 3LS and 4LS are engaged to close their contacts 3LS₂ and 4LS₂ to energize relay 14CR since the contacts 12CR₃ are already energized. When relay 14CR is energized, the contacts 14CR₁ in the saws in line are opened and solenoid 7SV2 and the relay 11CR. Energizing relay 11CR serves to maintain the saw motor M1 operating since contacts 11CR maintain the saw motor solencid 8SV1 energized. When the solenoid 7SV2 is energized, the valve 7SV is transferred so that fluid under pressure is supplied to the rod end lines of the tool bar cylinders 95 to retract the piston rods 98 thereof and withdraw the tool bars 90 and saws 91 out of the tree. When the tool bars 90 are fully moved out of the tree to the position shown by dashed lines in FIG. 7, the lug 100 on saws 91 engage the limit switches 5LS and 6LS to close same and energize relay 16CR since the contacts 14CR₄ have already been closed. This completes the sawing cycle and serves to lockout the saws by opening the contacts 16CR₂ and maintaining relay 14CR to keep contacts 14CR₁ open. Inturn the Energizing relay 16CR serves to close the contacts 16CR₁ in the bed tilt up circuit to energize the up solenoid 6SV1 and transfer valve 6SV so that fluid under pressure is supplied to rod end line of the bed fluid cylinders 56 and retract their piston rods 58 to pivot the bed 14 along with the tree held thereon by the clamping mechanism 15 upwardly to the horizontal position as previously described in the manual operation. When the bed has pivoted up to the horizontal position, the limit switch 1LS is activated to close contacts 1LS₁ and de-energize solenoid 6SV1 to stop the movement of piston rods 58.

The activation of limit switch 1LS also closes the contacts 1LS₂ t to energiae the clamp lockout relay 9CR. This opens the contacts 9CR₂ in the clamp circuit to prevent re-energization of the solenoid 4SV1 if the pressure switch 3PS is deactivated while at the same time closes contacts 9CR₁ to energize the out solenoid 4SV2 of the valve 4SV. This transfers the valve 4SV to supply fluid to the rod end line of the cylinders 119 to retract the piston rods 118 thereof and open the clamps 111. When the clamps 111 are fully open, the back pressure causes contacts 4PS₂ of pressure switch 4PS to open and de-energize solenoid 4SV2 with the clamps in the open position. Therefore, it will be seen that the clamps 111 will be maintained in their open position through the contacts 9CR₁ until the automatic processing cycle is complete and contacts 23CR₃ are opened to de-energize relay 9CR and open contacts 9CR₁.

At the same time the clamping mechanism 15 is being opened, the contacts 9CR₄ in the delimber and traverse in circuit are closed to energize the in solenoid 9SV1 to transfer valve 9SV and supply fluid under pressure to the rod end lines of cylinders 140 in the traversing mechanism 19 and retract the piston rods 144 thereof to pull the drive units 121 in until the sprocket drive units 130 engage the tree trunk and cause the back pressure to open the contacts 8PS₁ of the pressure switch 8PS. This also charges the accumulator 308 so that the units 121 may move toward and away from the tree trunk to conform thereto while the pressure thereon is maintained substantially constant. The transfer of valve 9SV also supplies fluid under pressure to the closed end lines of the delimber cylinders 244 to extend their piston rods 242 and move the movable delimber blades 201 into contact with the tree trunk. It will be noted that the springs 238 in the compression tube 232 cause the inward force on the blades 201 to remain substantially constant while the blades are allowed to move to conform to the tree trunk.

When the pressure switch 8PS is activated, the contacts 8PS₂ in the traverse forward control circuit are closed which activates the forward solenoid 10SV1 and relay 17CR since the contacts 4PS₃ have already been closed when the clamps 111 are fully opened and the relay 16CR was energized by the outward movement of the saws 91. This supplies fluid under pressure to the drive motors M2 on the drive units 121 to rotate the sprocket units 130 to drive the tree forwardly across the bed 14. Once relay 17CR is energized, it closes holding contacts 17CR₁ across the contacts 8PS₂ and 4PS₃ to maintain the forward movement of the tree trunk across the bed 14.

In the meantime, the operator has manipulated the length selector switch TSS to the appropriate position for the length at which the tree trunk is to be cut. This connects the appropriate contacts of the traversing length switch TLS to the hot wire 320 so that when the sprocket 330 attached thereto is rotated the appropriate number of revolutions for the particular length selected, the selected contacts $TLS_1$-$TLS_4$ will be closed to energize the relay 18CR. This closes the holding contacts $18CR_2$ to maintain the relay 18CR until contacts $20CR_1$ are open. Engerizing relay 18CR opens the contacts $18CR_1$ in the forward traversing circuit to de-energize the relay 17CR and the solenoid 10SV1 to stop the rotation of motors M2. This also opens the contacts $18CR_3$ in the saw enable circuit to de-energize the relay 14CR which in turn allows the contacts $14CR_1$ to close in the saw in circuit and energize the in solenoid 7SV1 and the relay 10CR since the contacts $12CR_2$ were already closed. This energizes the solenoid 8SV1 so as to rotate the chain saws 91 while at the same time moving the tool bars 91 in toward each other. This causes the saws 91 to move in toward each other and then move out as was described above when the tree felled. At the same time, the contacts $18CR_3$ have been closed and the contacts $10CR_2$ are closed when relay 10CR is energized to energize the measurement enabling relay 20CR and open contacts $20CR_1$ to de-energize relay 18CR. Thus, when the saws 91 have completed their cycle and relay 16CR is again energized by the closure of limit switches 5LS and 6LS, the contacts $16CR_3$ are again closed and the traverse motors M2 are again powered to move the tree forwardly across the bed 14.

The measurement and cutting process will be repeated until the shut down limit switch 8LS is closed as a result of the topped tree trunk reaching the upper traversing unit 121 as will be explained.

In the meantime, the minimum diameter limit switch 13LS will be closed when the predetermined minimum diameter of the tree trunk reaches the upper traversing unit 121. This energizes the topper solenoid 5SV1 which tops the tree as explained herein before. The traversing of the tree is continued until the shutdown switch 8LS is closed after the topped end of the tree trunk passes the upper drive unit 121.

Closing switch 8LS energizes relay 21CR to close holding contacts $21CR_2$ to maintain relay 21CR energized and also closes contacts $21CR_1$ in the length selection circuit to energize relay 18CR and stop the traversing of the tree trunk across the bed 14. This also energizes relays 22CR and 23CR of the shutdown circuit. The contacts $11CR_2$ and $16CR_4$ are placed in the shutdown circuit to prevent inadvertent activation until the saws 91 are fully out and the sawing cycle is not in process. Thus, when relay 22CR is energized, contacts $22CR_1$ will be open to de-energize the relay 12CR and disable the saws in circuit. Contacts $22CR_2$ in the clamps in circuit also open to disable this circuit. Contacts $23CR_5$ in the delimber and traverse out circuit are closed to energize the out solenoid 9SV2 to transfer valve 9SV and supply fluid to the closed end lines of the traversing cylinders 140 and the rod end line of the delimber cylinders 244 to open them. Contacts $23CR_4$ in the bed tilt down circuit are closed while contacts $23CR_3$ in the bed tilt up circuit are opened so that the bed 14 starts to tilt down as soon as the contacts $9PS_1$ of the pressure switch activated by the opening back pressure of the traversing cylinders 140 and delimber cylinders 244 are closed. Also, the contacts $23CR_2$ are closed in the outrigger up circuit to energize the up solenoid 3SV1 and raise the ground engaging plates 174 of outriggers 160 upwardly and inwardly along path P3 to retract them. Contacts $23CR_1$ are also closed to energize the saw up solenoid 2SV1 and raise the housing 71 to its upward position. The bed 14 continues to pivot downwardly toward its vertical position until the maximum auto down limit switch 9LS is opened to de-energize the down solenoid 6SV2 to stop the downward motion of the bed 14. The machine is now ready to start its recycling operation and the operator drives the prime mover 11 toward the next tree to be processed. It will thus be seen that when the bed 14 has become aligned with the next tree trunk to close the alignment limit switch 11LS and open the contacts $12LS_1$ and close contacts $12LS_2$ of the alignment switch 12LS, the cycle will be repeated.

It is to noted that because the saw housing 71 is not moved between the time the tree is severed and the tree is processed, the relative position between the drive sprocket 330 of the traversing length switches $TLS_1$-$TLS_4$ and the saws 91 has no effect on the accuracy of the measurement of hte lengths of the tree trunk to be cut. Also, the measurement circuitry may be provided with additional switches to process the tree into sections having a particular length in response to the tree trunk diameter. For example, the tree trunk may be cut into saw log lengths until a first diameter is reached and thereafter into pulpwood lengths.

The relays 13CR and 14Cr provide emergency control of the saws 91. If the back pressure in the closed end line of tool bar cylinders 95 continues to rise after the pressure switch 13PS is opened, the emergency pressure switch 7PS is closed to energize relay 13CR. This opens contacts $13CR_1$ to de-energize the in solenoid 7SV1 and closes contacts $13CR_2$ to energize relay 11CR and solenoid 7SV2 and move the tool bars 90 out. When the limit switches 5LS and 6LS are closed, the emergency lockup relay 15CR is energized because contacts $13CR_5$ are closed. This closes contacts $15CR_2$ to maintain relay 15CR and disable the out solenoid 7SV2 until the system is restarted.

If a process stoppage occurs, the operator simply closes the holding switch $PB_4$ to stop the automatic processing of the tree and manually controls the components of the machine until the stoppage is cleared or has someone clear the stoppage. He then releases the holding switch $PB_4$ and the automatic operation continues.

Generally, when the operator is harvesting trees, he is felling the trees from standing timber and wishes to deposit the processed tree into an appropriate receiving vehicle or in a clearing where the processed trees can be easily gathered. This can be easily accomplished by driving the prime mover 11 toward a standing tree. If automatic processing is desired, the operator closes contacts $1SS_2$ of the system mode switch 1SS to power the automatic control prior to reaching the tree so that the bed 14 is automatically aligned with the tree and the clamping mechanism 15 as well as the outrigger means 18 to be deployed. After the tree has been felled by the cutting assembly 16, it is held on bed 14 and the bed 14 starts to pivot upwardly toward its horizontal position. When the bed and tree have pivoted to a positoin where the centerlines CL-T and CL-B for an included angle of 10°-15° with the horizontal, the operator depresses the holding switch $PB_4$ to place the automatic controls on hold while at the same time engaging the manual controls. This places the tree with its center of gravity generally aligned with and located within the wheelbase of the prime mover 11. The operator then manually controls the outriggers 160 to retract same so that the prime mover 11 can be operated to maneuver the tree to the vehicle to catch the processed tree or to a clearing. Because the tree is aligned with the centerline CL-P of the prime mover 11 and its center of gravity is located above and within the wheelbase of the prime mover, stability is maintained during movement while at the same time requiring a minimum operating area for maneuvering. This minimum area is the machine length. When the operator maneuvers the tree to the desired position with the prime mover, he releases the holding switch PB$_4$ to allow automatic operation to continue.

The operation of the invention using the cutting assembly 516 is similar to the first embodiment. The fluid cylinders 520 are connected to valve 2SV the same as cylinders 66 are shown. Since the motor M1 is not needed, the valve 9SV is eliminated. The cylinders 540 replace cylinders 95 and are connected to valve 7SV. The saw height selector switch 2SS would control the height of the shear units 530 during manual operation and contacts 5CR$_1$; 12CR$_1$; 2PS$_2$; and 23CR$_1$ control the saw height in the automatic mode. The selector swithc 6SS would control the movement of the shear units 530 in manual mode and the contacts 13CR$_1$; 14CR$_1$; 12CR$_2$; 13CR$_2$; 14CR$_2$; 15CR$_1$; and 16CR$_2$ would control the units 520 in the automatic mode.

While specific embodiments of the invention have been disclosed herein, it is to be understood that full use may be made of modifications, substitutions and equivalents without departing from the scope of the inventive concept.

We claim:
1. A tree harvesting machine including:
clamping means for gripping an upright tree adjacent its base;
cutting means for severing the tree at its base below said clamping means;
a prime mover for selectively moving said machine;
articulating means for shifting the tree from an upright position to a substantially horizontal position about an axis of rotation normal to the longitudinal axis of the tree and located above said clamping means when the tree is in its upright position, said articulating means including a support bed pivoted to said prime mover at its upper end for rotation about said axis of rotation normal to the longitudinal centerline of said prime mover to maintain substantially vertical alignment between said tree and said longitudinal centerline of said prime mover, said support bed mounting said cutting means at its lower end and mounting said clamping means above said cutting means; and
traversing means for moving said tree longitudinally of itself and said support bed after said tree has been felled, said traversing means including a plurality of gripping members selectively and drivingly engagable with said tree trunk, and power means for rotating said gripping members to selectively move said tree trunk.

2. The tree harvesting machine of claim 1 further including shifting means for selectively varying the distance between said clamping means and said cutting means.

3. The tree harvesting machine of claim 1 further including forcing means for exerting an upward force on the tree while said cutting means is severing the tree.

4. A tree harvesting machine including:
clamping means for gripping an upright tree adjacent its base;
cutting means for severing the tree at its base below said clamping
a prime mover for selectively moving said machine;
articulating means for shifting the tree from an upright position to a substantially horizontal position about an axis of rotation normal to the longitudinal axis of the tree and located above said clamping means when the tree is in its upright position, said articulating means including a support bed pivoted to said prime mover at its upper end for rotation about said axis of rotation normal to the longitudinal centerline of said prime mover to maintain substantially vertical alignment between said tree and said longitudinal centerline of said prime mover, said support bed mounting said cutting means at its lower end and mounting said clamping means above said cutting means;
delimbing means engagable with a tree on said bed to delimb same; and,
traversing means for moving said tree across said bed, said delimbing means fixed relative to said bed and delimbing said tree as said traversing means moves said tree across said bed.

5. The tree harvesting machine of claim 4 further including topper means for selectively severing the tree adjacent said delimbing means.

6. The tree harvesting machine as set forth in claim 1 further including measuring means for measuring the amount of movement of said tree longitudinally of itself by said traversing means with respect to a fixed position on said machine.

7. The tree harvesting machine as set forth in claim 1 further including outrigger means for leveling said machine.

8. The tree harvesting machine of claim 6 wherein said fixed position is aligned with said cutting means and further including control means operatively connecting said traversing means, said measuring means and said cutting means to selectively stop the traversing of said tree in response to a prescribed amount of movement of said tree past said fixed position to activate said cutting means while the tree is so stopped to sever same in a prescribed length and to again activate said traversing mechanism to move said tree longitudinally of itself.

9. A compact tree harvesting machine for cutting trees substantially longer than said machine including:
a motor vehicle movable along its longitudinal axis and having a length substantially shorter than said tree to be harvested;
a bed support frame mounted on said motor vehicle longitudinally fixed relative to said motor vehicle, and extending above said motor vehicle;
a support bed pivotally mounted on said support frame about a single generally horizontal pivot axis generally perpendicular to the longitudinal axis of said motor vehicle, spaced above said motor vehicle at the front end thereof, fixed longitudinally with respect to said motor vehicle and vertically aligned with a point immediately forward of the support area of said motor vehicle for movement of said bed from a generally vertical plane immediately forward of said motor vehicle to a generally horizontal plane above said motor vehicle; the remote end of said bed opposite said pivot axis being adjacent the ground when said bed is in the substantially vertical plane; and, pivot means for selectively pivoting said bed about said pivot axis.

10. The tree harvesting machine of claim 9 wherein said support bed is constructed and arranged to shift the effective center of mass of said machine forward as said bed is shifted from a substantially vertical plane to a substantially horizontal plane; and further including traversing means for selectively holding and moving said tree longitudinally of itself across said support bed.

11. The compact tree harvesting machine of claim 10 further including clamping means carried by said support bed adjacent said remote end for holding a tree adjacent its base onto said bed so that as said bed is pivoted and said tree is pivoted rearwardly over said motor vehicle substantially in vertical alignment with said longitudinal axis of said vehicle, the center of mass of said machine will be shifted forwardly to offset the rearwardly shifting center of mass of said tree to maintain the combination tree-machine center of mass located over said motor vehicle.

12. The compact tree harvesting machine of claim 11 further including cutting means carried by said remote end of said bed for selectively severing said tree.

13. The compact tree harvesting machine of claim 10 further including outrigger means for selectively leveling said motor vehicle.

14. The compact tree harvesting machine of claim 11 further including outrigger means for selectively urging the front end of said motor vehicle and thus said bed upwardly to exert an upward force on said tree through said clamping mechanism.

15. The compact tree harvesting machine of claim 10 further including means for enlarging the effective support area of said machine.

16. The tree harvesting machine of claim 15 further including
means for holding said tree onto said support bed and exerting an upward force on said tree before said tree is felled;
cutting means for severing said tree adjacent the ground while said force is exerted thereon to fell said tree; and,
traversing means for selectively moving said felled tree longitudinally of itself across said support bed.

17. The compact tree harvesting machine of claim 16 further including delimbing means for selectively delimbing said tree as said tree is moved by said traversing means.

18. The tree harvesting machine of claim 1 wherein said cutting means includes a housing, positioning means connecting said housing to said support bed for selectively varying the position of said housing relative to said bed, a pair of opposed cutting members pivotally mounted within said housing and movable out of said housing toward each other in a plane generally normal to the tree trunk, and drive means for selectively and simultaneously moving said cutting members toward each other to sever the tree trunk.

19. The tree harvesting machine as set forth in claim 18 wherein said cutting members each include a tool bar, pivotally mounted-within said housing and a chain-type saw movably carried along the periphery of said tool bar, said saw having spaced projecting teeth thereon, and said drive means pivoting said saws toward each other until said teeth of one saw overlap the teeth of said other saw; said cutting means further including motor means for synchronously driving said saws to prevent interference of said overlapping teeth on said saws.

20. The tree harvesting machine of claim 18 wherein each of said cutting members includes a shear blade defining a cutting edge therealong, said shear blade cutting edges lying in a parallel abutting relationship when said cutting members are fully pivoted toward each other, said drive means exerting an inwardly directed force on each of said cutting members generally centered through the area of contact between said shear blade and said tree trunk.

21. The tree harvesting machine of claim 1 wherein said traversing means further includes a pair of support frames pivoted to opposite sides of said support bed and longitudinally spaced therealong for pivotal movement over said bed and said tree thereon along paths generally normal to the centerline of said support bed, each of said frames rotatably mounting one of said gripping members thereon for rotation about an axis generally normal to said tree and said power means including a drive motor drivingly connected to said gripping members for rotating said gripping members about their axes, said traversing means further including positioning means for selectively pivoting said frames about their axes.

22. The tree harvesting machine of claim 21 wherein said positioning means further includes accumulator means for constantly urging said support frames and said gripping members toward said tree trunk while allowing relative movement of said support frames toward and away from said tree trunk.

23. The tree harvesting machine as set forth in claim 4 wherein said delimbing means includes a plurality of movable delimbing blades selectively engagable with the tree, said delimbing means carried by said prime mover and positioned to engage said tree when said support bed is in its substantially horizontal pivotal position.

24. The tree harvesting machine of claim 10 further including delimbing means mounted on the rear end of said support frame for receiving said tree therein when said support bed is pivoted to said substantially horizontal plane and for delimbing said tree as said traversing means moves said tree.

25. The tree harvesting machine of claim 24 wherein said delimbing means includes a plurality of delimbing blades movable toward said tree in a plane substantially normal thereto when said tree is substantially horizontal and positioning means for selectively moving said blades toward and away from said tree.

26. In a tree harvesting machine including a motor vehicle base, a support frame on said base and a support bed means pivotally mounted on the forward end of said support frame for selectively gripping and supporting a tree and for moving a thusly gripped and supported tree from a substantially vertical position forwardly of said vehicle to a substantially horizontal position above said vehicle, the improvement comprising:
delimbing means mounted on the rear end of said support frame, and constructed and arranged to receive said tree therein when said support bed means moves said tree thereon to said substantially horizontal position, said delimbing means spaced a fixed prescribed distance from the pivot axis of said support bed means and including:
- a housing mounted on said support frame and defining an upwardly facing arcuate opening therethrough adapted to receive the trunk of said tree therein when said tree is in its substantially horizontal position;
- a fixed delimbing blade carried by said housing and defining an upwardly projecting arcuate cutting edge, said cutting edge facing rearwardly of said machine, projecting into said opening a prescribed distance, and centered on the lower side of said opening in vertical alignment with said tree so that the trunk of said tree rests thereon when said tree is in said substantially horizontal position;
- a pair of movable delimber blades movably mounted in said housing on opposite sides of said fixed blade, in a plane substantially perpendicular to the centerline of said tree in its substantially horizontal position, each of said movable blades defining an inwardly facing arcuate cutting edge facing rearwardly of said machine to co-operate with said cutting edge on said fixed blade to delimb a tree;
- guide means mounted on said housing and operatively associated with said movable blades to cause said movable blades to project into said opening as said blades move on said guide means along a linear path; and,
- positioning means for selectively moving said movable blades toward and away from each other along said guide means to cause said cutting edges of said movable blades to selectively engage the trunk of said tree and for maintaining substantially constant force on said movable blades toward the trunk of said tree while allowing limited movement of said movable blades with respect to the centerline of said tree; and,
- traversing means for selectively moving said tree through said delimbing means to cause said blades to delimb said tree.

27. In a tree harvesting machine including a motor vehicle base, a support frame on said base, and a support bed means pivotally mounted on the forward end of said support frame for supporting a tree and movable from a substantially vertical position forwardly of said vehicle to a substantially horizontal position above said vehicle, the improvement comprising:
- traversing means operatively associated with said support bed means for selectively gripping a tree on said bed means and for selectively moving said tree longitudinally of it self across said support bed means along a prescribed path, said traversing means including:
- idler support means rotatably mounted on said support bed means and arranged to engage the trunk of a tree to be supported on said bed means and comprising teeth means for projecting into said tree to prevent movement of said tree laterally of said support bed as said tree is moved longitudinally of itself;
- a first drive unit pivotally mounted on one side of said support bed for movement toward and away from the tree on said support bed through a plane substantially normal to said bed, said first drive unit comprising a first frame, first teeth means rotatably carried by said first frame for driving engaging said tree, first drive means for selectively rotating said first teeth means to drive said tree longitudinally of itself across said bed, and first positioning means for selectively pivoting said first frame toward and away from said support bed to cause said first teeth means to engage said tree; and,
- a second drive unit pivotally mounted on that side of said support bed opposite the side on which said first drive unit is mounted and displaced longitudinally on said support bed from said first drive unit for movement toward and away from the tree on said support bed through a plane substantially normal to said bed, said second drive unit comprising a second frame, second teeth means rotatably carried by said second frame for driving engaging said tree, second drive means for selectively rotating said second teeth means to drive said tree longitudinally of itself across said bed, and second positioning means for selectively pivoting said second frame toward and away from said support bed to cause said second teeth means to engage said tree,
- said idler support means and said first and second drive units being constructed and arranged to movably support said tree between said teeth means thereof.

28. In a tree harvesting machine as set forth in claim 27 wherein said traversing means further includes forcing control means operatively associated with said first and second positioning means for causing said first and second positioning means to exert a substantially constant force on said tree through said teeth means while allowing limited pivotal movement of said frames toward and away from said bed.

29. A compact tree harvester as set forth in claim 10 wherein said motor vehicle includes:
- a main support frame;
- a first ground engaging means movably carried by said support frame on one side thereof;
- a second ground engaging means movably carried by said support frame on the opposite side thereof;
- driving means operatively connected to said first and second ground engaging means for independently moving each of said means to propel said motor vehicle; and
- steering means operatively associated with said driving means for independently and variably controlling the speed and direction of movement of said first and second ground engaging means to steer said vehicle.

second switch means mounted on the remote end of the bed for causing said pivot means to pivot the remote end of said bed toward vertical alignment with the near end of said bed upon activation of said second switch means by contact with a standing tree; and, third switch means mounted on the near end of said bed for disabling said second switch means upon activation of said second switch means by contact with the standing tree to cause said bed to align with the standing tree.

30. The machine of claim 9 further including clamping means for fixing a tree with respect to said bed and forcing means for exerting an upward force on the front end of said motor vehicle to lift said bed when said bed is in a generally vertical plane and exert an upward force on said tree.

31. The machine of claim 9 further including alignment control means comprising:
- first switch means for causing said pivot means to move said bed to a pivotal position so that the remote end of said bed is adjacent the ground and located forwardly of the near end of said bed;

* * * * *